(12) United States Patent
Holung et al.

(10) Patent No.: US 9,927,845 B1
(45) Date of Patent: Mar. 27, 2018

(54) HINGE ASSEMBLY

(71) Applicant: Lenovo (Singapore) Pte. Ltd., Singapore (SG)

(72) Inventors: Joseph Anthony Holung, Wake Forest, NC (US); Tin-Lup Wong, Chapel Hill, NC (US); Bouziane Yebka, Apex, NC (US); Philip John Jakes, Durham, NC (US); Joseph David Plunkett, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/344,000

(22) Filed: Nov. 4, 2016

(51) Int. Cl.
| G06F 1/16 | (2006.01) |
| E05D 3/06 | (2006.01) |
| E05D 11/00 | (2006.01) |
| E05D 3/12 | (2006.01) |

(52) U.S. Cl.
CPC ............. *G06F 1/1681* (2013.01); *E05D 3/06* (2013.01); *E05D 3/122* (2013.01); *E05D 11/00* (2013.01); *E05D 11/0054* (2013.01); *G06F 1/1618* (2013.01); *E05D 2011/0072* (2013.01); *E05Y 2900/606* (2013.01)

(58) Field of Classification Search
CPC ............................ G06F 1/1681; G06F 1/1618
See application file for complete search history.

(56) References Cited

U.S. PATENT DOCUMENTS

| 5,987,704 A * | 11/1999 | Tang ..................... G06F 1/1681 16/342 |
| 2016/0132075 A1* | 5/2016 | Tazbaz ................. G06F 1/1681 361/679.27 |
| 2016/0201367 A1* | 7/2016 | Kato ........................ E05D 3/12 361/679.09 |
| 2017/0275935 A1* | 9/2017 | Shang ....................... E05D 3/06 |

* cited by examiner

*Primary Examiner* — Anthony Q Edwards
(74) *Attorney, Agent, or Firm* — Brian J. Pangrle

(57) ABSTRACT

An apparatus can include a processor; an electronic component accessible by the processor; a first housing attached to a first axle that includes a first gear where the first housing includes the processor; a second housing attached to a second axle that includes a second gear where the second housing includes the electronic component accessible by the processor; and a hinge assembly that includes an intermediate axle that includes a first intermediate gear that meshes with the first gear, a second intermediate gear that meshes with the second gear, a first bridge component that securely positions the first axle parallel to the intermediate axle and a second bridge component that securely positions the second axle parallel to the intermediate axle.

20 Claims, 19 Drawing Sheets

HINGE ASSEMBLY

TECHNICAL FIELD

Subject matter disclosed herein generally relates to technology for hinges, for example, hinge assemblies for computing or other devices.

BACKGROUND

Various types of devices, display devices, computing and display devices, etc. exist where, for example, a hinge assembly allows for orienting one portion with respect to another portion. For example, a display portion may be oriented with respect to a keyboard portion.

SUMMARY

An apparatus can include a processor; an electronic component accessible by the processor; a first housing attached to a first axle that includes a first gear where the first housing includes the processor; a second housing attached to a second axle that includes a second gear where the second housing includes the electronic component accessible by the processor; and a hinge assembly that includes an intermediate axle that includes a first intermediate gear that meshes with the first gear, a second intermediate gear that meshes with the second gear, a first bridge component that securely positions the first axle parallel to the intermediate axle and a second bridge component that securely positions the second axle parallel to the intermediate axle. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
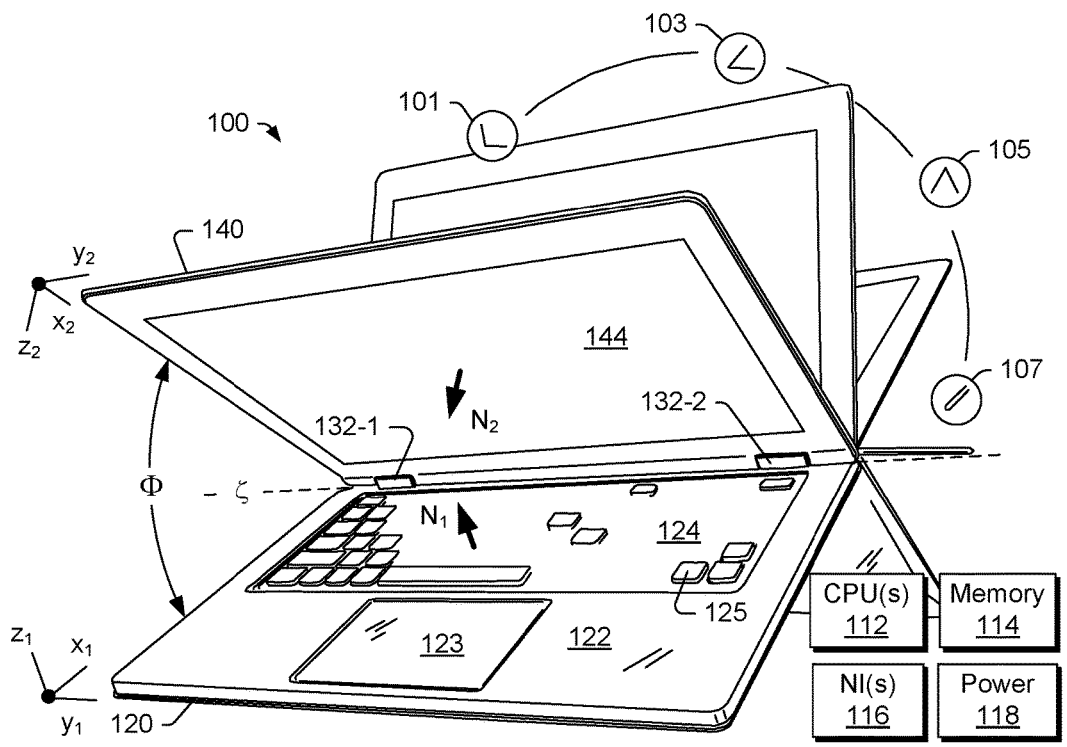
FIG. 1 is a diagram of examples of systems.
Figure 1:
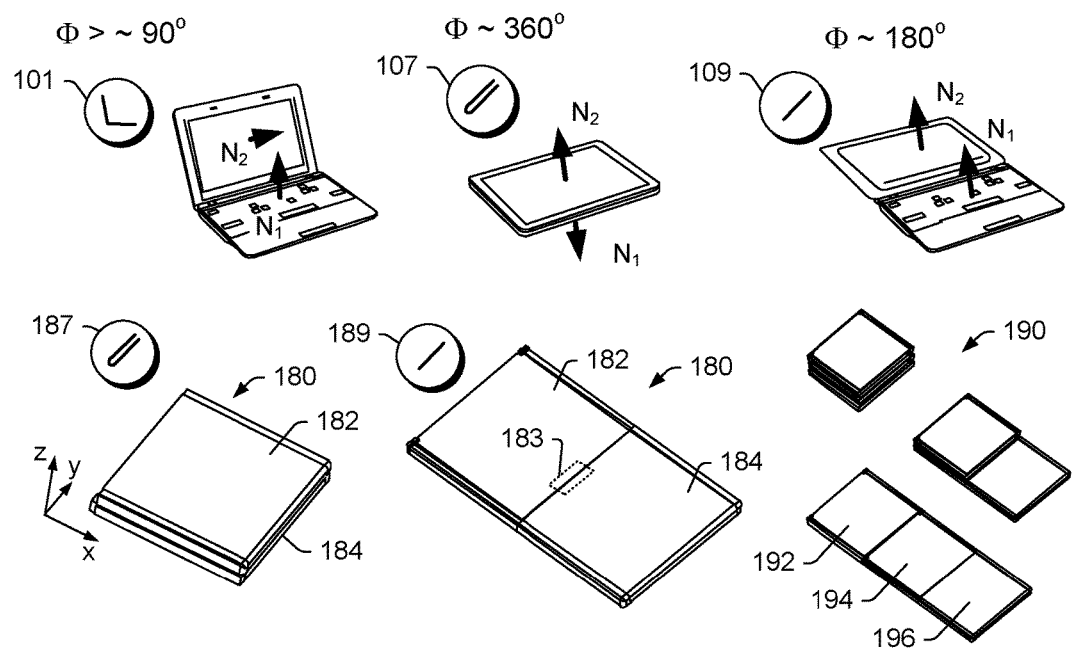

FIG. 1 shows an example of a system 100 that includes a keyboard housing 120 and a display housing 140 that are pivotable with respect to each other via movement about one or more hinges 132-1 and 132-2 (e.g., hinge assemblies). FIG. 1 also shows an example of a system 180 that includes a first housing 182 and a second housing 184 that are adjustable with respect to each other via movement about one or more hinges 183 (e.g., hinge assemblies) and an example of a system 190 that includes a first housing 192, a second housing 194 and a third housing 196 that may be adjustable with respect to each other via movement about hinges.

As an example, the system 100, the system 180 and/or the system 190 may include one or more processors 112, memory 114 (e.g., one or more memory devices), one or more network interfaces 116, and one or more power cells 118. Such components may be, for example, housed with the keyboard housing 120, the display housing 140, the keyboard housing 120 and the display housing 140, the housing 182, the housing 184, the housing 182 and the housing 184, one or more of the housings 192, 194 and 196, etc.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle $\Phi$ is about 0 degrees), the vectors $N_1$ and $N_2$ would be pointing toward each other.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

As shown in FIG. 1, the system 180 can include a folded orientation 187 and a planar orientation 189. As an example, one or both of the housings 182 and 184 may include a display. As shown in FIG. 1, the system 190 can include various orientations, including, for example, a planar orientation of the three housings, a partially folded orientation and a folded orientation. As an example, a three housing system may be configurable in more than one folded orientation with respect to a "middle" housing. For example, the housings 192 and 196 may be folded with respect to the housing 194 with the housing 192 on the top side or bottom side or with the housing 196 on the top side or bottom side.

Figure 2:
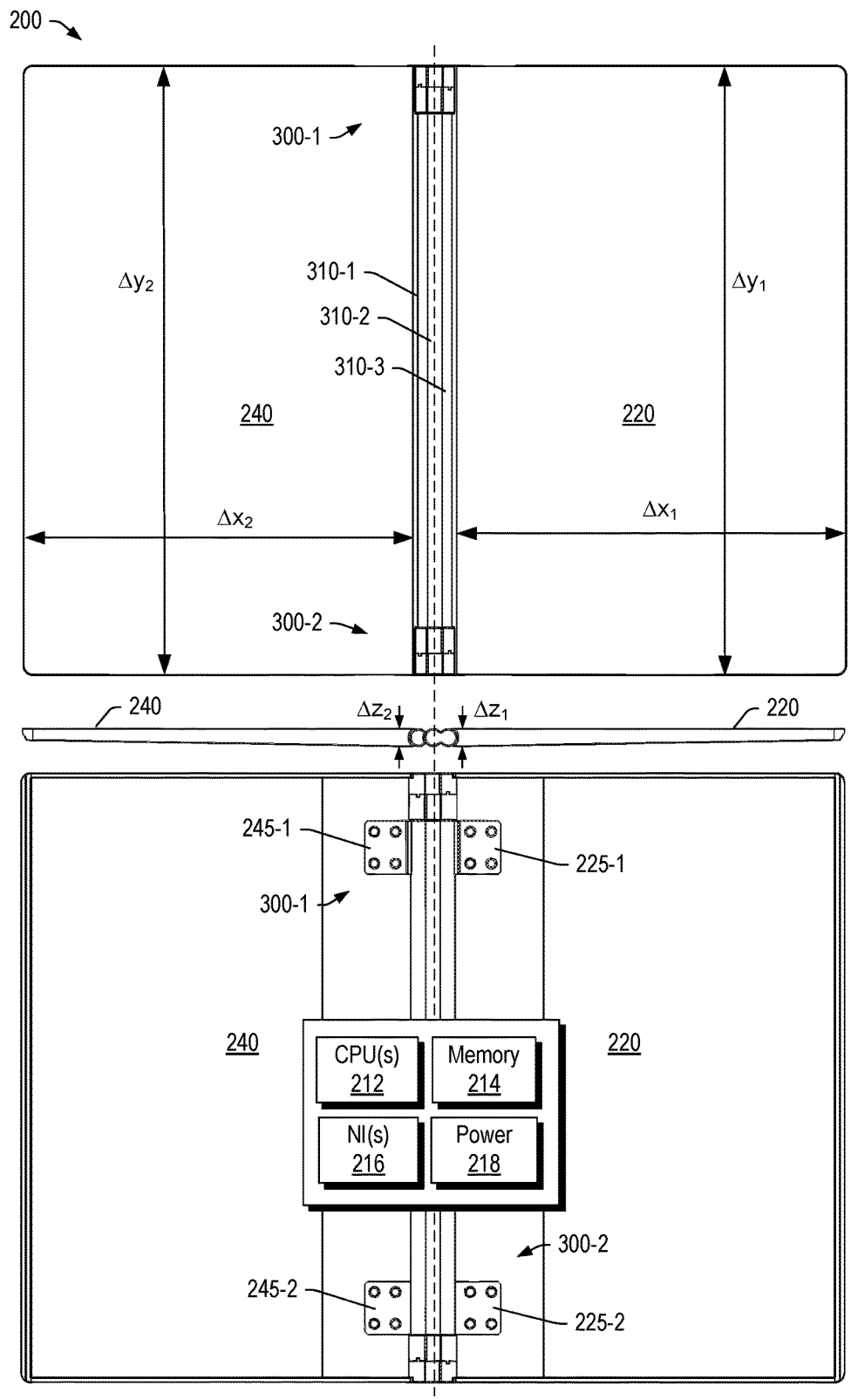
FIG. 2 is a diagram of an example of a device with hinge assemblies.

FIG. 2 is a diagram of an example of a device 200 that includes a first housing 220, a second housing 240, a first set of links 225-1 and 245-1, a second set of links 225-2 and 245-2 that link to a first hinge assembly 300-1 and a second hinge assembly 300-2, respectively, where tubular covers 310-1, 310-2 and 310-3 extend between the first hinge assembly 300-1 and the second hinge assembly 300-2.

As an example, a link can be of a desired shape, length, etc. As an example, a link may be integral to a housing. For example, a housing may be formed of a material that is molded and/or machined to form a link. As an example, a link can be an integral link that is integral to material that forms a housing or a link can be an attachable link that can be attached to a housing, for example, via one or more attachment mechanisms (e.g., adhesive, welding, rivets, screws, bolts, sockets, etc.).

In the example of FIG. 2, the first hinge assembly 300-1 and the second hinge assembly 300-2 may be the same but rotated by 180 degrees to be, for example, a right side hinge assembly and a left side hinge assembly as defined by a user's right and left hands. As described with respect to FIG. 4, one or more components may be arranged such that a difference or differences exist between the first hinge assembly 300-1 and the second hinge assembly 300-2 (e.g., with respect to covers). As an example, when viewing the device 200 from a front edge of the housing 220, the hinge assembly 300-1 may be referred to as a right side hinge assembly and the hinge assembly 300-2 may be referred to as a left side hinge assembly.

The device 200 can be oriented in a closed orientation (e.g., a closed state), in an open orientation (e.g., an open state) and in a tablet orientation (e.g., a tablet state). For example, the device 200 may be oriented in the orientation 101, the orientation 103, the orientation 105, the orientation 107 and the orientation 109 of FIG. 1. In FIG. 2, the device 200 is shown in an open orientation where the housings 220 and 240 are in a common plane and operatively coupled via the hinge assemblies 300-1 and 300-2. The device 200 of FIG. 2 may be, for example, transitioned to a back-to-back orientation (e.g., a folded tablet orientation) or, for example, may be transitioned to a front-to-front orientation (e.g., a folded closed orientation).

In FIG. 2, various dimensions are shown, including $\Delta x_1$, $\Delta x_2$, $\Delta y_1$, $\Delta y_2$, $\Delta z_1$, and $\Delta z_2$. The dimensions can be referenced to the coordinate systems illustrated in FIG. 1 where x may be considered to be a housing depth direction from a front edge to a back edge (e.g., hinge side edge), where y may be considered to be a housing widthwise direction from a left side to a right side (e.g., as may be referenced with respect to a keyboard, etc.), and where z may be considered to be a housing thickness direction from a front side to a back side (e.g., a display side or a keyboard side of a housing to an exterior surface side that can form a portion of a case in a closed orientation such as that of a clamshell device).

As an example, the device 200 may include one or more processors 212, memory 214 (e.g., one or more memory devices), one or more network interfaces 216, and one or more power cells 218 (e.g., one or more lithium-ion batteries, etc.). Such components may be, for example, housed with the first housing 220 and/or the second housing 240. As an example, a processor can be in the first housing 220 or the second housing 240 and an electronic component accessible by the processor can be in the second housing 240 or in the first housing 220 where one or more wires may electrically couple the processor and the electronic component and pass through and/or over a portion of the hinge assembly 300-1, the hinge assembly 300-2 and/or one or more of the tubular covers 310-1, 310-2 and 310-3. As an example, the housing 220 and the housing 240 can include wireless circuitry for wireless communication between a an electronic component of the housing 220 and an electronic component of the housing 240.

In the example of FIG. 2, the device 200 can include one or more types of circuitry, optionally one or more types of circuitry as described with respect to the system 100 of FIG. 1. As an example, the device 200 can include a flexible circuit board that spans at least a portion of the first housing 220 and that spans at least a portion of the second housing 240. In such an example, the hinge assemblies 300-1 and 300-2 can define a radius of curvature that allows for bending of the flexible circuit board. For example, the radius of curvature may allow for repeated bending and unbending of the flexible circuit board over a number of cycles where one or more circuits that extend across the bend can operate without an excessive risk of failure.

As an example, the device 200 can include multiple circuit boards where, for example, one or more flexible connectors (e.g., wires, optical guides, etc.) connect two or more of the circuit boards, which may be disposed in different housings. For example, consider a first circuit board disposed in the first housing 220 and a second circuit board disposed in the second housing 240 being operatively coupled via wires and/or optical guides that span the first and second housings 220 and 240 across the hinge defined at least in part by the hinge assemblies 300-1 and 300-2.

As an example, the device 200 can include a display that includes at least one flexible portion. In such an example, the display can be disposed at least in part in the first housing 220 and be disposed at least in part in the second housing 240 where the hinges assemblies 300-1 and 300-2 define a minimum radius of curvature in the closed orientation of the device 200 that avoids damage to the display. As an example, such a display may be a touchscreen display where, for example, one portion of the touchscreen display may render a graphic of a keyboard (e.g., a computer keyboard with letter keys, etc.). For example, consider the first housing 220 including a portion of a touchscreen display that can be utilized as a keyboard and the second housing 240 including a portion of a touchscreen display that can be utilized as a display. As an example, such a device may automatically detect a device orientation to determine which portion of the touchscreen display is to be a keyboard and which portion of the touchscreen display is to be a display. For example, the device 200 can be operated with the first housing 220 on a planar surface (e.g., a desk), on a lap, etc. or the device 200 may be operated with the second housing 240 on a planar surface, on a lap, etc. In such an example, a user need not necessarily be aware of an orientation of the device 200 (e.g., the device 200 can be self-aware and configure itself responsive to sensing its own orientation in space, for example, with respect to gravity, etc.).

As an example, the device 200 can include two displays where, for example, one display is disposed in the first housing 220 and where the other display is disposed in the second housing 240. As an example, the first housing 220 and/or the second 240 can be a frame where, for example, a display can be oriented outwardly. For example, consider the closed orientation of the device 200 where the second housing 240 includes an outwardly facing display, which may be a touchscreen display. In such an example, the device 200 may be operated in a tablet mode. As an example, upon opening the device 200, the device 200 may transition from a tablet mode to a laptop mode or another mode, as desired. For example, in the open orientation of FIG. 2, the device may be operated in a tablet mode where the tablet screen size is approximately the size of the two housings 220 and 240 combined. In such an example, the device 200 may be in an extended tablet mode. As an example, upon transitioning the device 200 to an angle less than about 180 degrees (e.g., about 170 degrees or less), the device 200 may transition to a laptop (e.g., notebook) mode. In such a laptop mode, one of the housings 220 and 240 can include a keyboard portion, which may be rendered to a touchscreen display.

As an example, a device can include a processor; an electronic component accessible by the processor; a first housing attached to a first axle that includes a first gear where the first housing includes the processor; a second housing attached to a second axle that includes a second gear where the second housing includes the electronic component accessible by the processor; and a hinge assembly that includes an intermediate axle that includes a first intermediate gear that meshes with the first gear, a second intermediate gear that meshes with the second gear, a first bridge component that securely positions the first axle parallel to the intermediate axle and a second bridge component that securely positions the second axle parallel to the intermediate axle.

Figure 3:
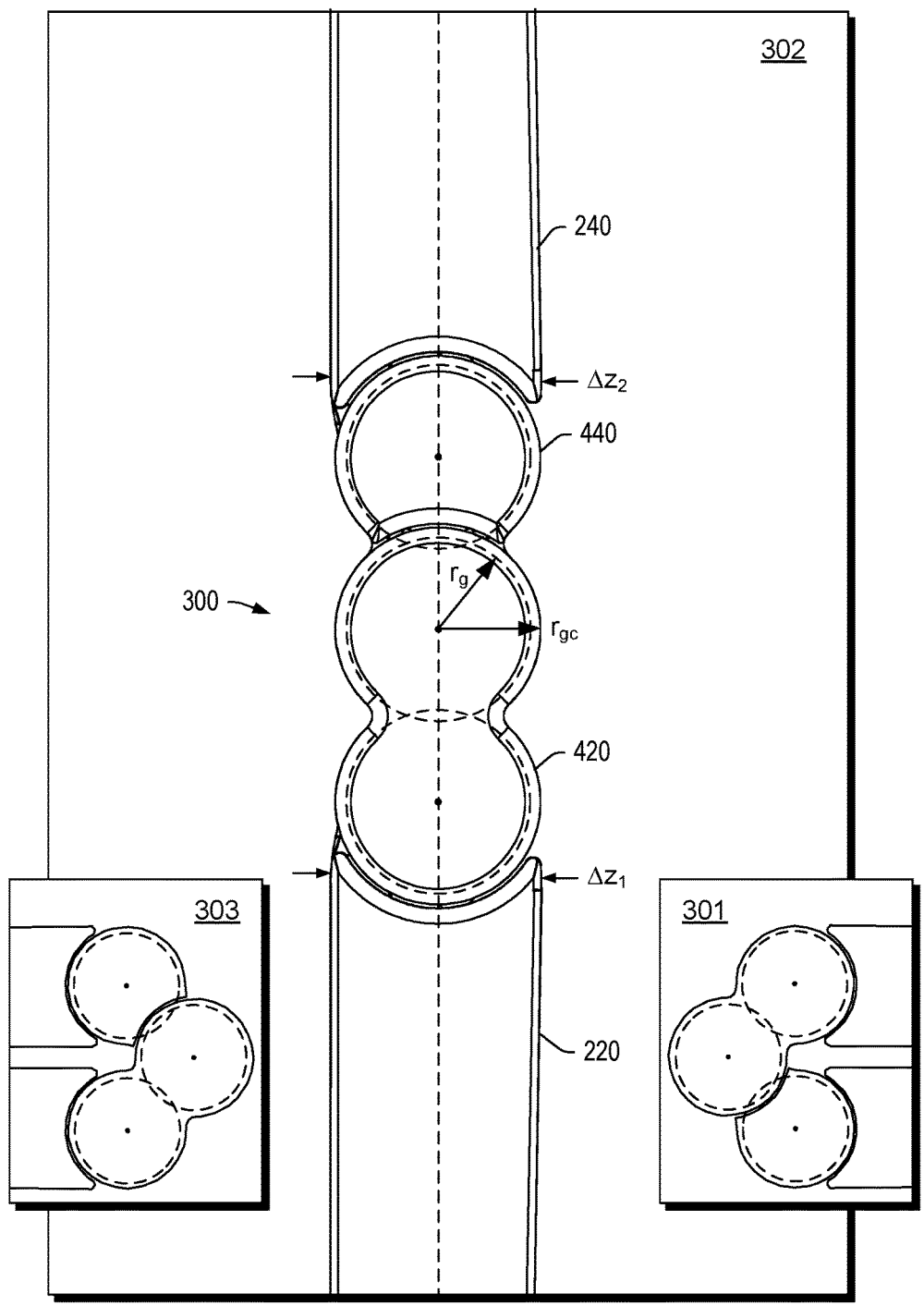
FIG. 3 is a diagram of a portion of the device of FIG. 2 in three example orientations.

FIG. 3 shows the hinge assembly 300 as operatively coupling the first housing 220 to the second housing 240 in a front-to-front orientation 301 (e.g., about 0 degrees), a substantially planar orientation 302 (e.g., about 180 degrees), a back-to-back orientation 303 (e.g., about 360 degrees) where the hinge assembly 300 includes a cover 420 and a cover 440. In such an example, the cover 420 can be a bridge component that securely positions two axles in a parallel arrangement. For example, a first axle can include a first axis and a second axle can include a second axis where the cover 420 aligns the first axis and second axis to be parallel to each other.

In the example of FIG. 3, the hinge assembly 300 can provide for transitioning the housings 220 and 240 from one orientation to another in a relatively smooth manner via meshing of gears. An orientation may be an orientation within a range of angles from about 0 degrees to about 360 degrees. Friction force can be sufficient to maintain the housings 220 and 240 in an orientation when subjected to force of gravity. For example, consider a tent orientation (see, e.g., the orientation 105) where a front edge of the housing 220 and a front edge of the housing 240 can be in contact with a flat surface (e.g., a table, a desk, etc.) and where the hinge assembly 300 is at an apex or vertex of a triangular shape with an interior angle that may be in a range from about 10 degrees to about 170 degrees. In such orientations, the friction force can be sufficient to maintain the housings 220 and 240 in such an orientations without the hinge assembly 300 descending downward toward the flat surface due to gravity (e.g., where the interior angle would increase in value). The friction force may be adjustable, for example, via nuts, etc. (e.g., as to one or more axles), and may be set such that a user may readily transition the housings 220 and 240 from one orientation to another via hand or hands.

In the example orientation 302 of FIG. 3, the hinge assembly 300 is in an approximately 180 degree arrangement as to a first axis associated with a first axle, a second axis associated with a second axle and an intermediate axis associated with an intermediate axle where the intermediate axis is intermediate to the first axis and the second axis. As shown, the housings 220 and 240 are of approximately the same thickness and include crescent shaped edges that accommodate circular portions of the cover 420 and the cover 440, respectively. Such crescent shaped edges can be defined by respective radii that are slightly greater than an outer radius of the cover 420 and the cover 440. In FIG. 3, a cover radius $r_{gc}$ and an approximate gear radius $r_g$ are illustrated where the gear radius $r_g$ is illustrated with respect to gears that may be positioned in the hinge assembly 300 where meshing can occur, for example, between gears of a first pair of gears that includes an intermediate gear and between gears of a second pair of gears that includes an intermediate gear; noting that two intermediate gears can be included in the hinge assembly 300 along with a first gear that meshes with one of the intermediate gears and a second gear that meshes with the other of the intermediate gears where the two intermediate gears can be disposed about a common, intermediate axle (see, e.g., FIG. 9).

As shown in the example of FIG. 3, the thickness $\Delta z_1$ is approximately twice the cover radius $r_{gc}$ (e.g., approximately a diameter of the cover 420 or the cover 440). In such an example, the device 200 can lay flat on a flat surface such as a table or desk surface. In such an example, a relatively small clearance may exist between the covers 420 and 440 and the flat surface as the thicknesses of the housings 220 and 240 may be slightly greater than the radii of the covers 420 and 440. In such an example, tubular covers 310-1, 310-2 and 310-3 may have respective outer surfaces that do not contact the flat surface; thus, the mass of the device 200 can be accommodated by contact between surfaces of the housings 220 and 240 and the flat surface (e.g., a table surface, a desk surface, etc.). As an example, the tubular covers 310-1, 310-2 and 310-3 may be made of plastic material and/or metallic material. As an example, in a closed orientation (e.g., a closed clamshell), the tubular covers 310-1, 310-2 and 310-3 may be of an integrity sufficient to withstand shock when in contact with a hard surface (e.g., of a table, a desk, etc.).

As an example, a tubular cover can be made of a resilient material or otherwise formed to be of a thickness (e.g., cylindrical wall thickness) to be relatively resilient. As an example, a tubular cover can be a shock absorber. As an example, a tubular cover can be a hollow component, a solid component or a component that includes porosity, cells, etc., which may allow for shock absorbing properties. As an example, a tubular cover can be made of natural and/or synthetic rubber and can optionally include one or more openings that may, for example, allow for passage of wire or wires, optical fiber or fibers, air, etc. As an example, a tubular cover can include a socket where the socket can be, for example, a socket for a plug, a memory card, etc. For example, consider a USB type of socket or receptacle (e.g., micro, mini, etc.). As another example, consider a HDMI type of socket or another data transfer socket. As an example, a socket may be a power socket, for example, to power the device 200, charge a battery or batteries of the device 200, etc. As an example, a tubular cover may be rotatable about a longitudinal axis to position a socket and/or an opening and/or include a socket or opening cover that is rotatable to expose a socket, a passage, etc. As an example, a socket can include contact(s), wire(s) and/or fiber(s) which may operatively couple the socket to one or more components in the housing 220 and/or the housing 240 and/or within a tubular cover or tubular covers.

As an example, the covers 420 and 440 may be made of a plastic material and/or a metallic material. As an example, the covers 420 and 440 may provide protection for gears of the hinge assembly 300. As an example, gears may be made of a plastic material and/or a metallic material. As an example, axles may be made of a plastic material and/or a metallic material. As an example, in a widthwise direction, the covers 420 and 440 may be inset slightly from ends of the housings 220 and 240, which may help to protect the covers 420 and 440 from contact with a surface (e.g., during use, transport, etc. of the device 200). As an example, end surfaces of the covers 420 and 440 may optionally be flush with end surfaces of the housings 220 and 240.

Figure 4:
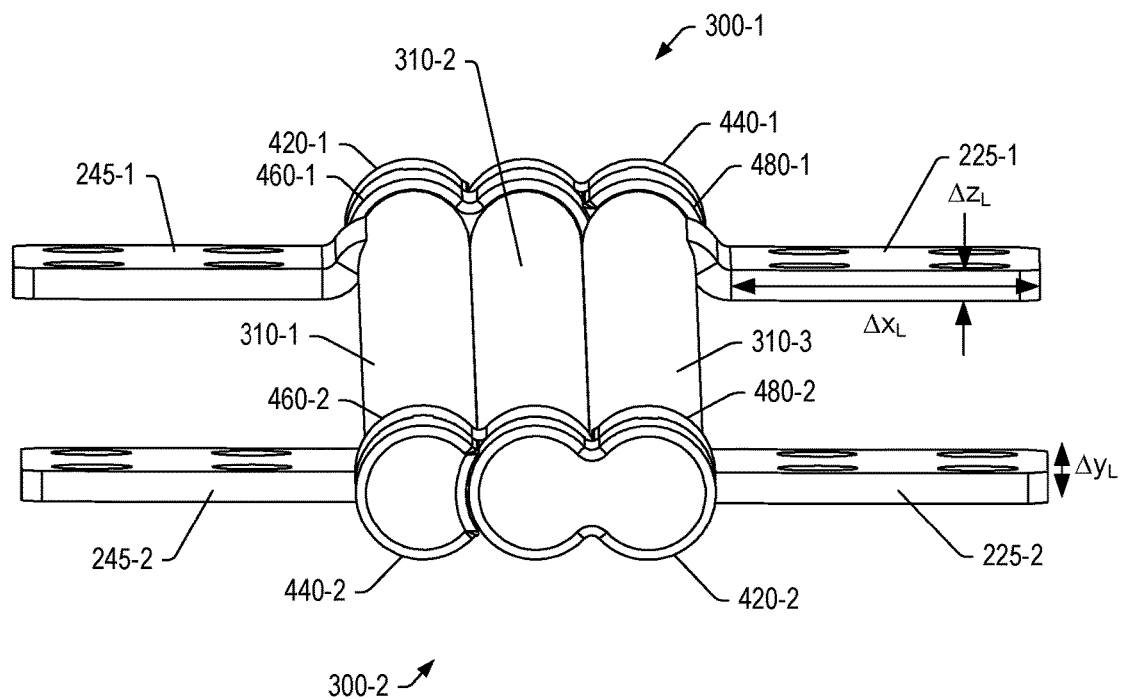
FIG. 4 is a diagram of an example of hinge assemblies.

FIG. 4 shows various components of the device 200 of FIG. 2. Specifically, FIG. 4 shows the links 225-1 and 225-2 that can attach the first housing 220 to the hinge assemblies 300-1 and 300-2, respectively, and the links 245-1 and 245-2 that can attach the second housing 240 to the hinge assemblies 300-1 and 300-2, respectively. FIG. 4 also shows the tubular covers 310-1, 310-2 and 310-3 as extending between the hinge assemblies 300-1 and 300-2. Further, FIG. 4 shows covers 420-1, 420-2, 440-1, 440-2, 460-1, 460-2, 480-1 and 480-2 as associated with the hinge assemblies 300-1 and 300-2. As an example, a link may be defined by various dimensions such as, for example, a length $\Delta x_L$, a width $\Delta y_L$ and a height $\Delta z_L$.

As mentioned, the hinge assemblies 300-1 and 300-2 may differ, for example, as to arrangement of one or more components such as, for example, a cover or covers. As shown in FIG. 4, the covers 460-1 and 460-2 and the covers 480-1 and 480-2 are shown as being mirror images of each other while the covers 420-1 and 420-2 and 440-1 and 440-2 are not, rather they are arranged similarly but rotated 180 degrees (e.g., about a center of rotation that would be at about the point where the lead line of the reference numeral 310-2 connects to the tubular cover 310-2).

Figure 5:
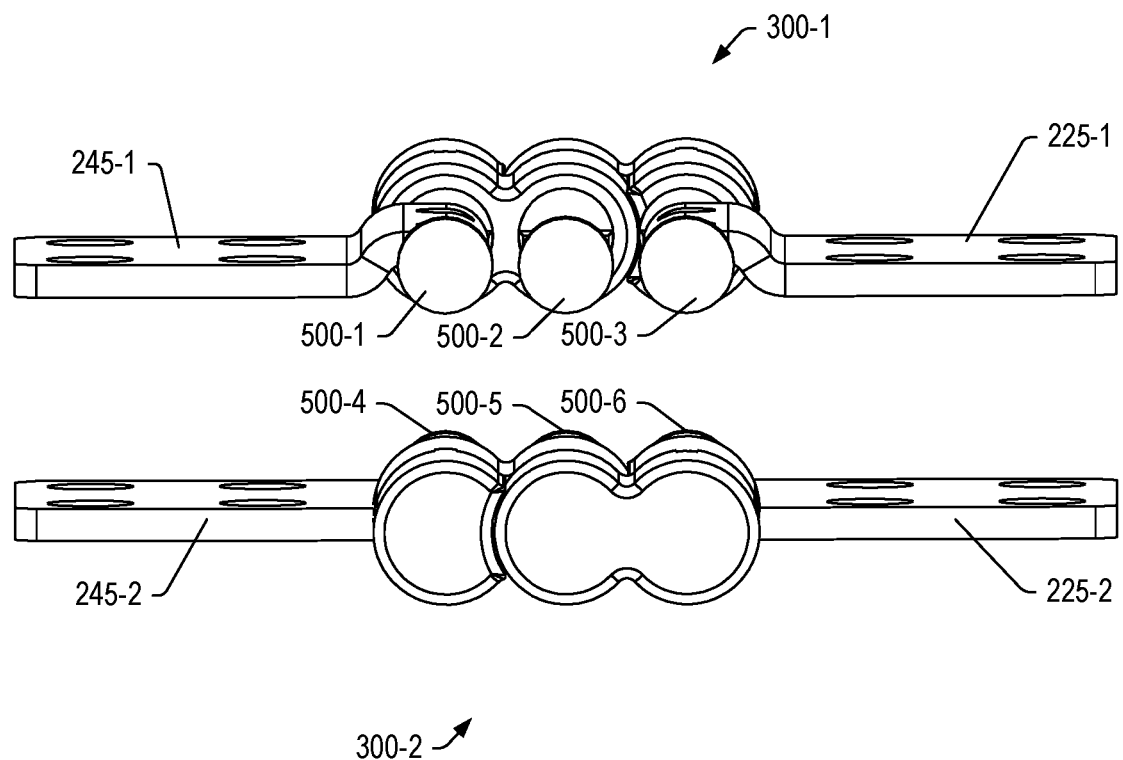
FIG. 5 is a diagram of a portion of the hinge assemblies of FIG. 4.

FIG. 5 shows the components of FIG. 4 without the tubular covers 310-1, 310-2 and 310-3 such that axles 500-1, 500-2, 500-3, 500-4, 500-5 and 500-6 can be seen. As shown, the axles 500-1, 500-2 and 500-3 are a first set of axles associated with the hinge assembly 300-1 and the axles 500-4, 500-5 and 500-6 are a second set of axles associated with the hinge assembly 300-2.

FIG. 5 also shows the link 225-1 attached to the axle 500-3, the link 245-1 attached to the axle 500-1, the link 225-2 attached to the axle 500-6 and the link 245-2 attached to the axle 500-4. The axles 500-3 and 500-4 can be first axles, the axles 500-1 and 500-6 can be second axles and the axles 500-2 and 500-5 can be intermediate axles.

Figure 6:
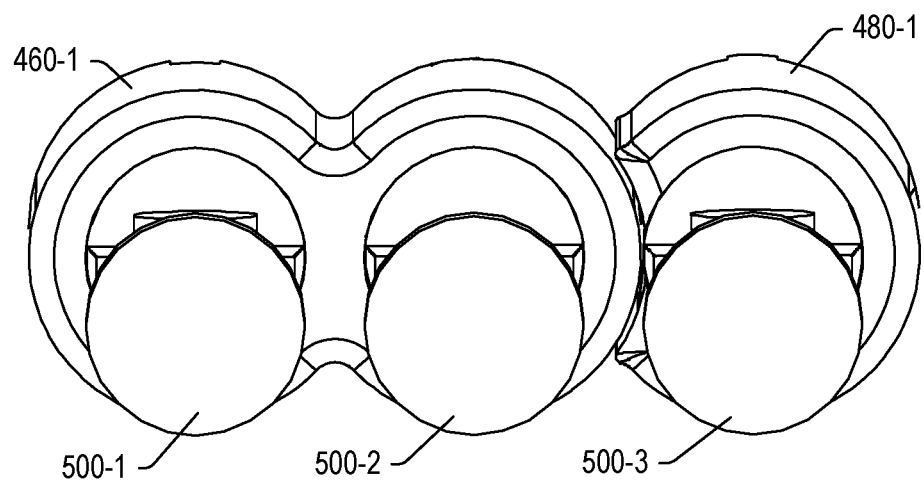
FIG. 6 is a diagram of a portion of the hinge assemblies of FIG. 4.
Figure 6:
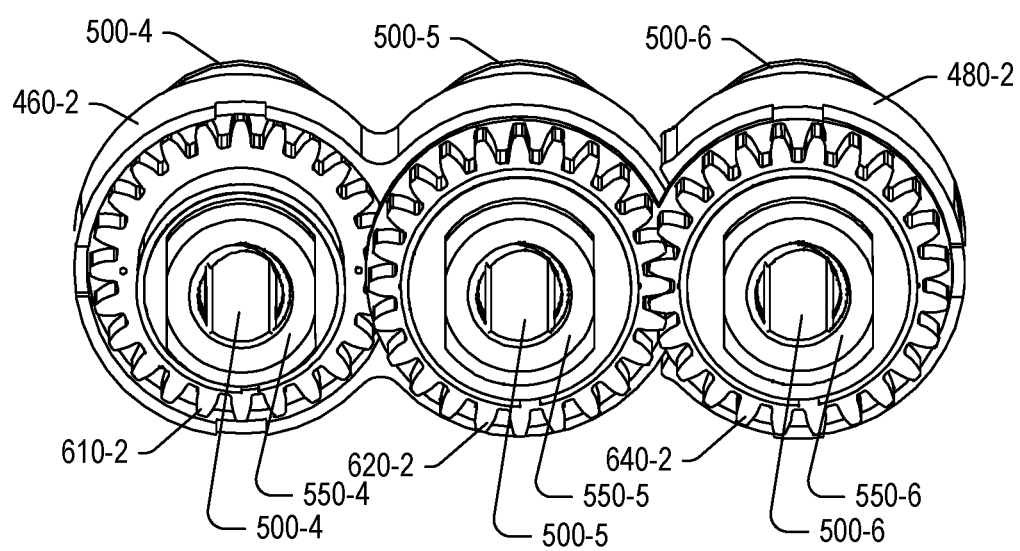

FIG. 6 shows various components of the hinge assemblies 300-1 and 300-2 without the covers 420-1, 420-2, 440-1 and 440-2 and with the covers 460-1, 460-2, 480-1 and 480-2. In FIG. 6, the axles 500-4, 500-5 and 500-6 are shown with corresponding nuts 550-4, 550-5 and 550-6. In FIG. 6, gears 610-2, 620-2 and 640-2 are also shown where the gear 610-2 is positioned with respect to the axle 500-4, the gear 620-2 is positioned with respect to the axle 500-5 and where the gear 640-2 is positioned with respect to the axle 500-6. As mentioned, the axle 500-4 can be a first axle, the axle 500-5 can be an intermediate axle and the axle 500-6 can be a second axle where the intermediate axle 500-5 is positioned between the first axle 500-4 and the second axle 500-6 when the axles 500-4, 500-5 and 500-6 form a line as in the planar orientation of the device 200 as shown in FIG. 2.

Figure 7:
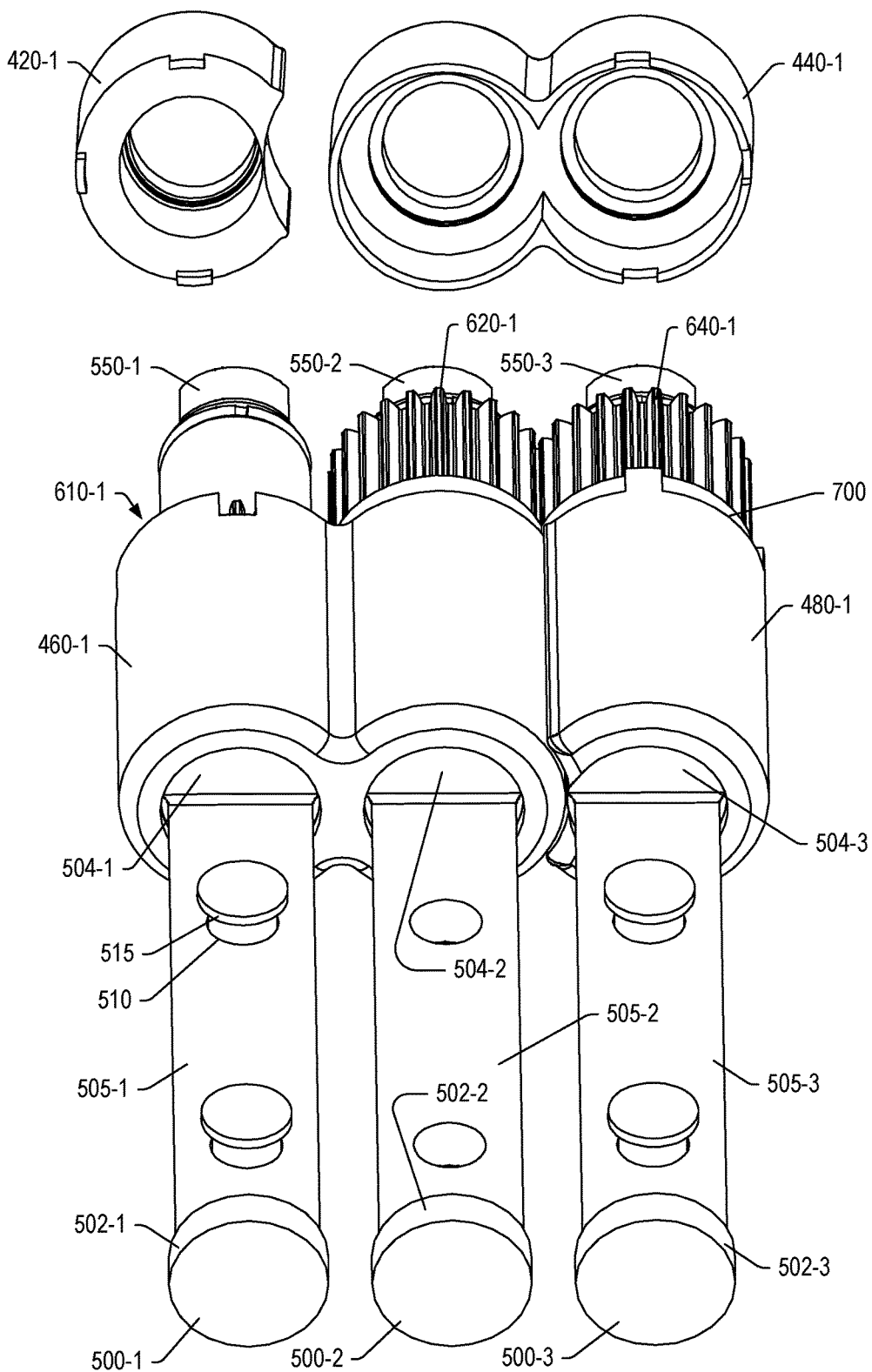
FIG. 7 is a diagram of an example of a hinge assembly.

FIG. 7 shows the hinge assembly 300-1 with the covers 420-1 and 440-1 removed while the covers 460-1 and 480-1 are in place. FIG. 7 also shows gears 620-1 and 640-1 while an arrow points to a gear 610-1, which is covered by the cover 460-1.

In FIG. 7, the axles 500-1, 500-2 and 500-3 are shown as including openings 510 (noting that the axle 500-2 may be without such an opening or openings) and as including a circular disc 502-1, 502-2 and 502-3 and a circular disc 504-1, 504-2 and 504-3 with a flat portion 505-1, 505-2 and 505-3. FIG. 7 show pegs 515 as received by openings 510, for example, to attach the link 245-1 to the axle 500-1 and to attach the link 225-1 to the axle 500-3.

In FIG. 7, nuts 550-1, 550-2 and 550-3 are shown which are paired with corresponding circular discs 504-1, 504-2 and 504-3. As shown, various components are disposed along the axle 500-1 and between the circular disc 504-1 and the nut 550-1, various components are disposed along the axle 500-2 and between the circular disc 504-2 and the nut 550-2, and various components are disposed along the axle 500-3 and between the circular disc 504-3 and the nut 550-3. Various components that are disposed along the axles 500-1, 500-2 and 500-3 differ.

In FIG. 7, the cover 460-1 can be a bridge component that can operatively couple the axle 500-1 and 500-2 in parallel alignment and the cover 440-1 may optionally be a bridge component that can operatively couple the axle 500-2 and 500-3 in parallel alignment; noting that, in FIG. 7, a bridge component 700 is shown that operatively couples the axle 500-2 and the axle 500-3.

As an example, a device can include two hinge assemblies where each of the hinge assemblies includes bridge components that can operatively couple axles as pairs where two pairs of axles can include a common intermediate axle. As shown in the example of FIG. 7, for one hinge assembly, the cover 460-1 can seat the circular discs 504-1 and 504-2 of the axles 500-1 and 500-2 while the bridge component 700 can receive portions of the axles 500-2 and 500-3 and the cover 440-1 can seat the nuts 550-2 and 550-3. Another hinge assembly can include a duplicate set of such components appropriately arranged to operatively couple another set of three axles where the first set of axles and second set of axles are aligned along three longitudinal and parallel axes. As an example, a first hinge assembly and a second hinge assembly may optionally include a common axle (e.g., a common intermediate axle, a common first axle and/or a common second axle). As an example, a first hinge assembly and a second hinge assembly may be covered at least in part by a single tubular cover. As an example, a first hinge assembly and a second hinge assembly may be operatively coupled via links that link to a first housing and via links that link to a second housing. In such an example, the first housing can bridge an axle of a first hinge assembly to an axle of a second hinge assembly and a second housing can bridge another axle of the first hinge assembly to another axle of the second hinge assembly.

Figure 8:
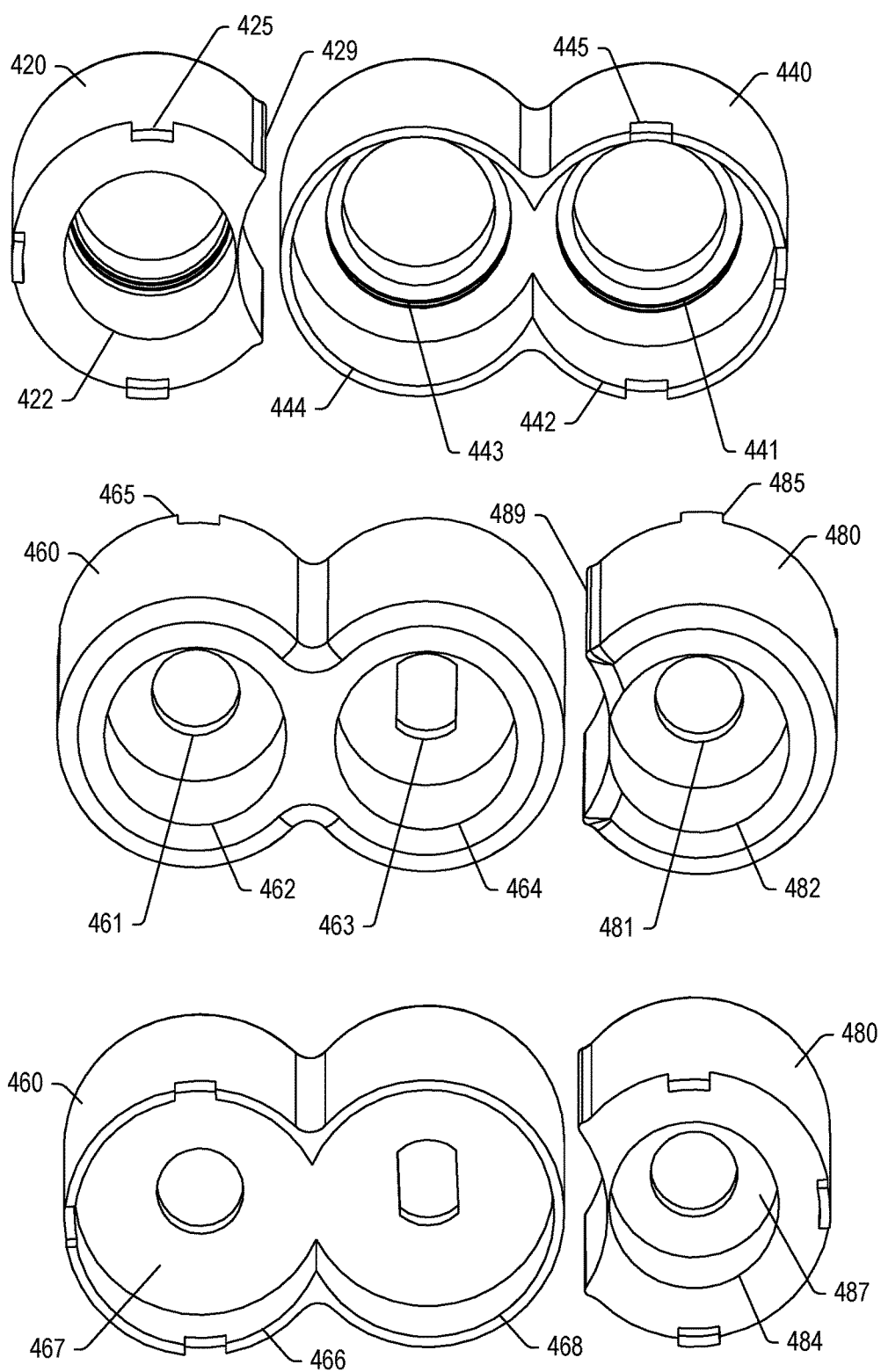
FIG. 8 is a diagram of examples of hinge assembly covers.

FIG. 8 shows the covers 420, 440, 460 and 480. The covers 420 and 440 can be considered to be end covers while the covers 460 and 480 can be disposed inwardly of ends of axles of a hinge assembly.

The cover 420 includes a circular bore 422, at least one key 425 (e.g., and/or keyway) and a crescent shaped side 429. The cover 440 includes a circular bore 441, a gear bore 442, a circular bore 443, a gear bore 444 and at least one keyway 445 (e.g., and/or key). As shown in FIG. 8, the gear bores 442 and 444 are configured to allow gears to mesh in an overlap region.

The cover 460 includes a circular axle bore 461, a larger circular bore 462, at least one keyway 465 (e.g., and/or key), a keyed axle bore 463, a larger circular bore 464, a gear bore 466, an axial face 467 and a gear bore 468. As shown in FIG. 8, the axial face 467 separates the circular bore 462 from the gear bore 466 and separates the circular bore 464 from the gear bore 468.

The cover 480 includes a circular axle bore 481, a larger circular bore 482, at least one key 485 (e.g., and/or keyway), a circular bore 484, an axial face 487 and a crescent shaped side 489 where the axial face 487 separates the circular bore 482 from the circular bore 484, where, for example, the circular bore 484 can be smaller in diameter than the circular bore 482.

Figure 9:
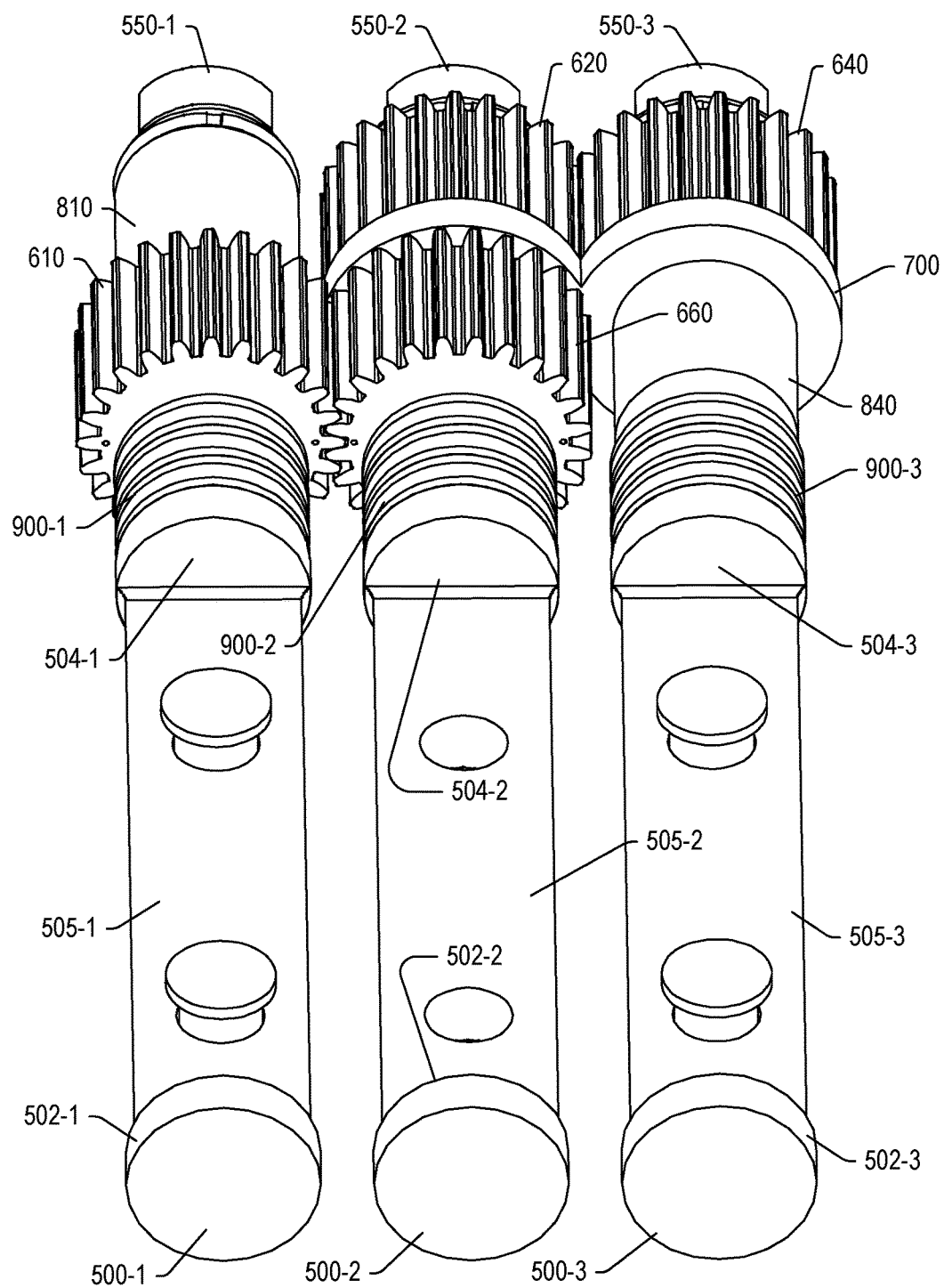
FIG. 9 is a diagram of a portion of the hinge assembly of FIG. 7.

FIG. 9 shows various components of the hinge assembly 300 without the covers 420, 440, 460 and 480. As shown, the axle 500-1 supports the gear 610, the axle 500-2 supports the gear 620 and a gear 660 and the axle 500-3 supports the gear 640 where the gear 610 meshes with the gear 660 and where the gear 620 meshes with the gear 640 and where the gears 620 and 660 are separated axially via the bridge component 700, which moves with the gear 660.

FIG. 9 also shows a bushing 810 and a bushing 840 as well as annular components 900-1, 900-2 and 900-3. The annular components 900-1 are disposed on the axle 500-1 between the circular disc 504-1 and an axial facing surface of the gear 610. The annular components 900-2 are disposed on the axle 500-2 between the circular disc 504-2 and an axial facing surface of the gear 660. The annular components 900-3 are disposed on the axle 500-3 between the circular disc 504-3 and an axial facing surface of the bushing 840 where an opposing axial facing surface of the bushing 840 abuts the bridge component 700.

Figure 10:
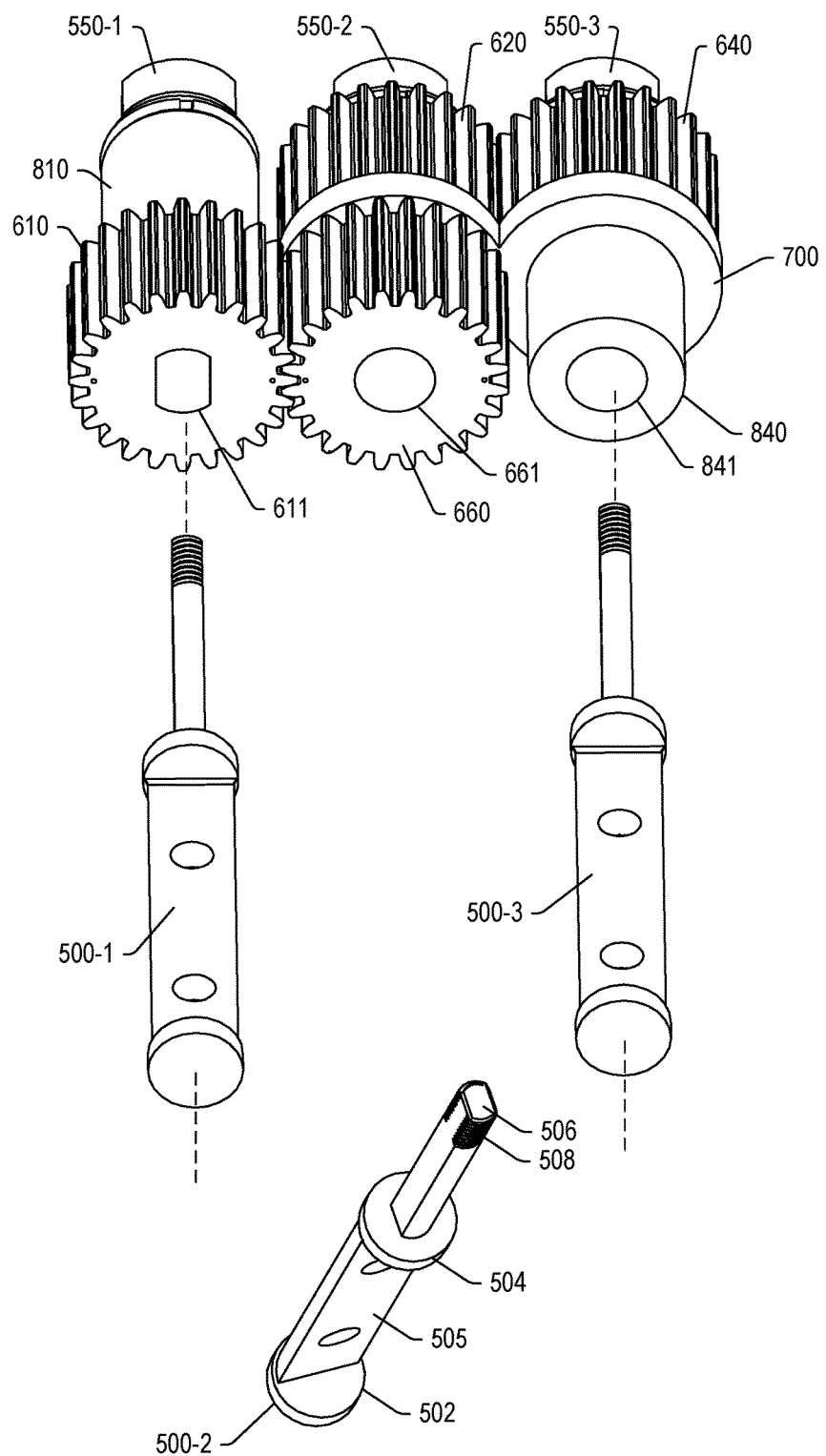
FIG. 10 is a diagram of a portion of the hinge assembly of FIG. 7.

FIG. 10 shows various components of the hinge assembly 300 without the annular components 900-1, 900-2 and 900-3, which may be axial spacing components, optionally including one or more Belleville washers (e.g., cone washers), which may allow for applying spring force (e.g., biasing force). For example, the nuts 550-1, 550-2 and 550-3 may be independently tightened or loosened such that the annular components 900-1, 900-2 and 900-3, respectively, apply more or less force with respect to the circular discs 504-1, 504-2 and 504-3, respectively. Such an approach can allow for adjustments to the hinge assembly 300 on an axle-by-axle basis (e.g., fine tuning, etc.).

As shown in FIG. 10, the axle 500-2 includes an end 506 and a threaded portion 508, which includes threads on a non-circular portion that is a keyed portion of the axle 500-2.

FIG. 10 shows the gear 610 as including a keyed bore 611, the gear 660 as including a circular bore 661 and the bushing 840 as including a circular bore 841. As shown in FIG. 10, the keyed bore 611 receives a keyed portion of the axle 500-1 (e.g., a keyed shaft portion of the axle 500-1) such that the gear 610 rotates with the axle 500-1, which can be attached to a link as may be attached to a housing. Upon rotation of the axle 500-1, the gear 610 rotates, which is meshed with the gear 660, which is coupled to the bridge component 700. As the gear 660 includes the circular bore 661 (e.g., an un-keyed bore), the gear 660 is not directly coupled to the axle 500-2. As shown in FIG. 10, as the bushing 840 includes the circular bore 841 (e.g., an un-keyed bore), the bushing 840 is not directly coupled to the axle 500-3.

Figure 11:
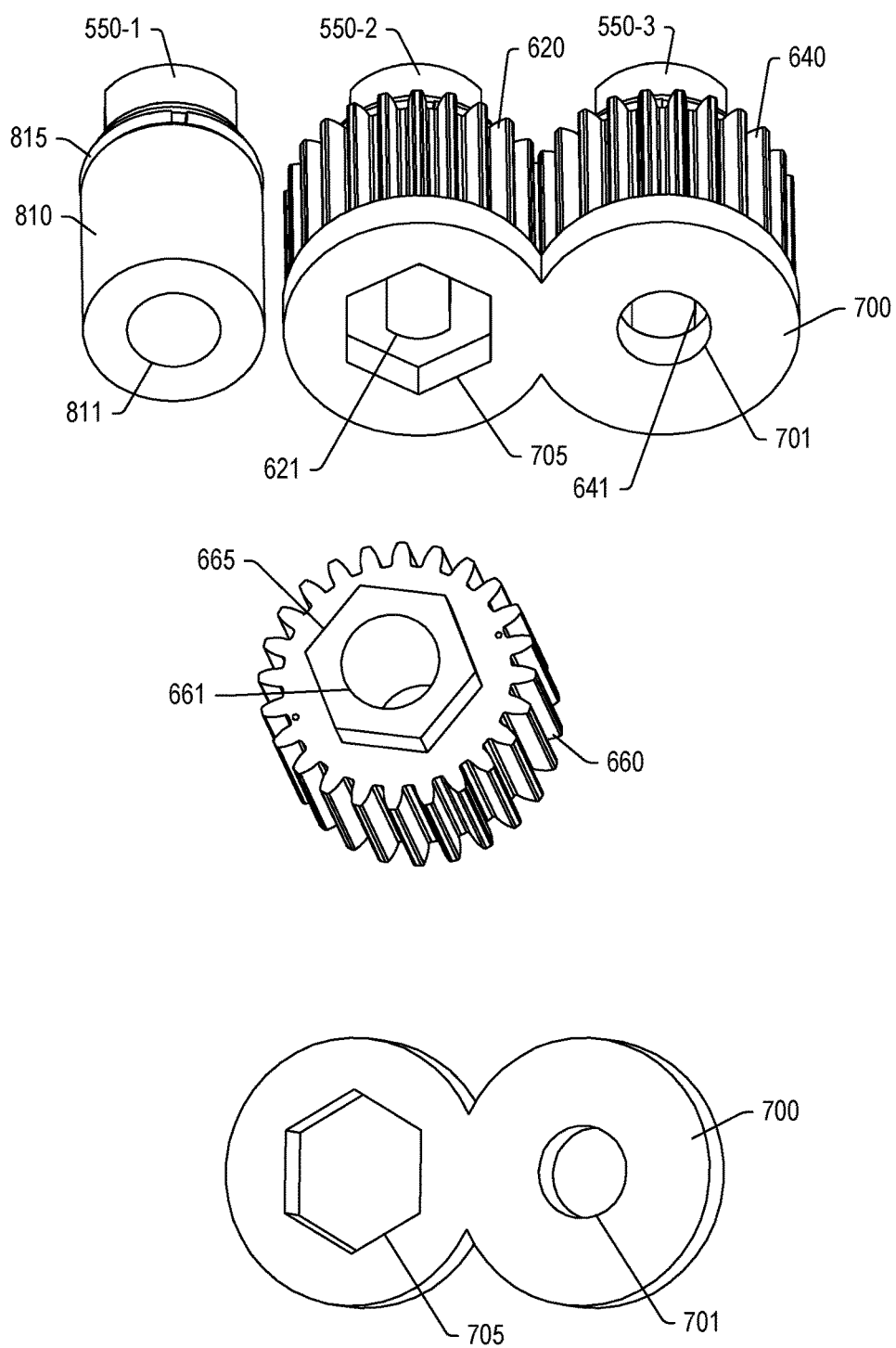
FIG. 11 is a diagram of a portion of the hinge assembly of FIG. 7.

FIG. 11 shows various components, including the gear 620, the gear 640, the gear 660, the bridge component 700, the bushing 810 and a clip 815. As shown, the bridge component 700 includes a circular opening 701 and a keyed opening 705 (e.g., a hexagonal opening) while the gear 660 includes a circular bore 661 and a key 665 (e.g., a hexagonal key) that can be received at least in part in the keyed opening 705. While a gear key and bridge component keyway are shown, such a key and keyway may be of a bridge component and of a gear. As an example, multiple key-keyway pairs may be included that act to locate one component with respect to another component (e.g., or components).

In FIG. 11, the bushing 810 is shown as including a circular bore 811 (e.g., an un-keyed bore). As an example, the clip 815 may exert a biasing force with respect to a cover.

In FIG. 11, the gear 620 is shown as including a keyed bore 621 (e.g., a keyway) that can receive a keyed portion of the axle 500-2 (e.g., a key) and the gear 640 is shown as including a keyed bore 641 (e.g., a keyway) that can receive a keyed portion of the axle 500-3 (e.g., a key). In such an arrangement the gear 620 moves with the axle 500-2 and the gear 640 moves with the axle 500-3 and the gears 620 and 640 mesh where spacing is maintained therebetween via the bridge component 700 and the gear 660 are keyed to the bridge component 700. For example, the diameter of the opening 701 can be approximately the same as a dimension of a shaft portion of the axle 500-3 (e.g., dimension between arc portions as separated by flats) and the circular bore 661 of the gear 660 can be approximately the same as a dimension of a shaft portion of the axle 500-2 (e.g., dimension between arc portions as separated by flats). As an example, the nuts 550-2 and 550-3 can be received in the circular bores 443 and 441 of the cover 440 (see FIG. 8), which can also securely space the axles 500-2 and 500-3.

The gears 620 and 640 can be covered by the cover 440 where the gear bore 444 receives the gear 620 and where the gear bore 442 receives the gear 640.

As shown in FIG. 11, the bridge component 700 is shaped with a perimeter such that it can be received in the gear bore 442 and the gear bore 444 of the cover 440. The gear 660 can be received at least in part in the gear bore 444 of the cover 440 and, for example, at least in part in the gear bore 468 of the cover 460. The gear 610 can be received at least in part in the gear bore 466 of the cover 460.

The bushing 810 can be received at least in part in the bore 422 of the cover 420 and the bushing 840 can be received at least in part in the bore 484 of the cover 480. As shown in FIG. 8, the cover 420 is separate from the cover 440 and the cover 480 is separate from the cover 460.

Figure 12:
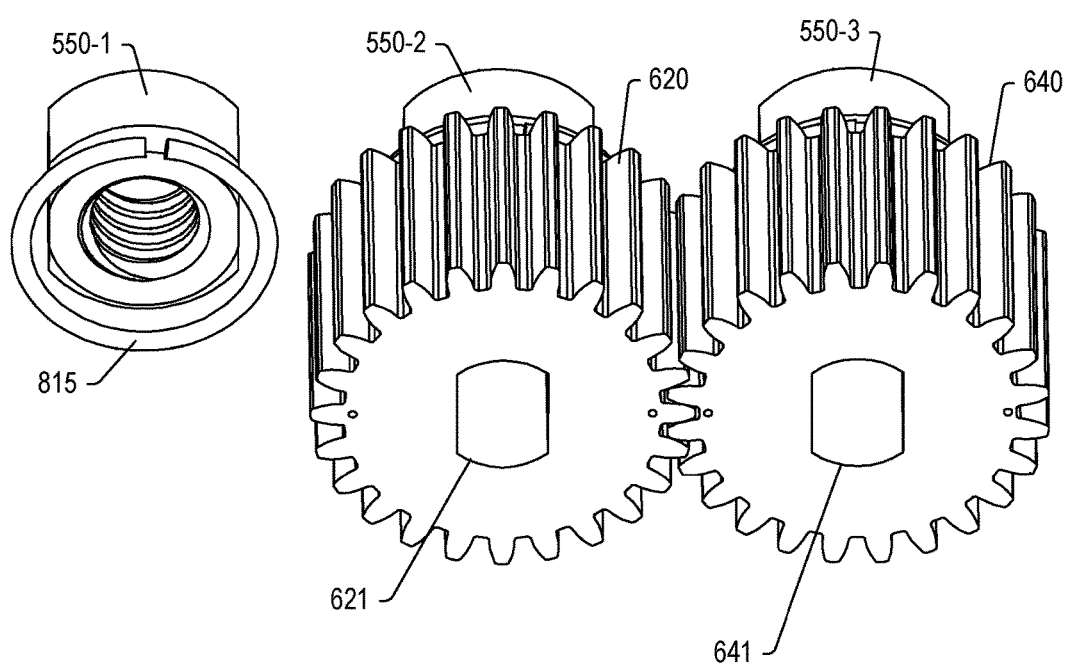
FIG. 12 is a diagram of a portion of the hinge assembly of FIG. 7.

FIG. 12 shows various components, including the gear 620, the gear 640, the nuts 550-1, 550-2 and 550-3 and the clip 815. As shown, the gear 620 includes the keyed bore 621 and the gear 640 includes the keyed bore 641.

Figure 13:
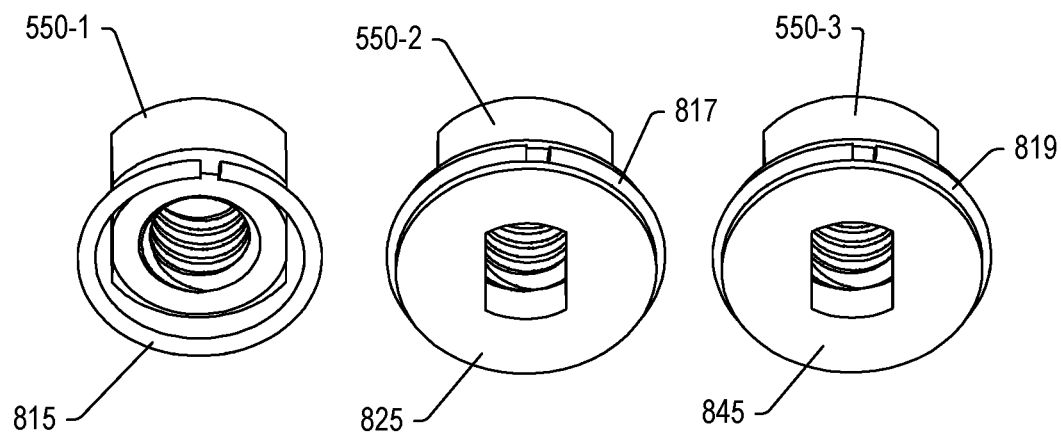
FIG. 13 is a diagram of a portion of the hinge assembly of FIG. 7.

FIG. 13 shows the nuts 550-1, 550-2 and 550-3, the clip 815, clips 817 and 819 and keyed washers 825 and 845 that include respective annular grooves to receive the clips 815 and 817, respectively.

Figure 14:
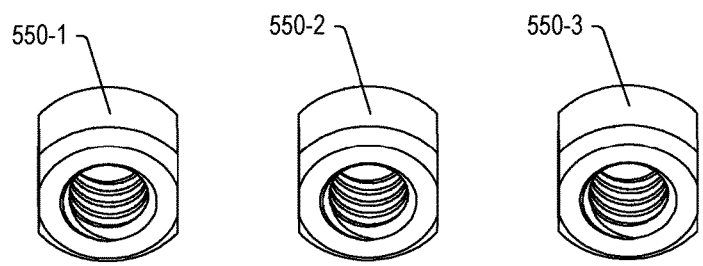
FIG. 14 is a diagram of a portion of the hinge assembly of FIG. 7 and a perspective view of a portion of the device of FIG. 2.
Figure 14:
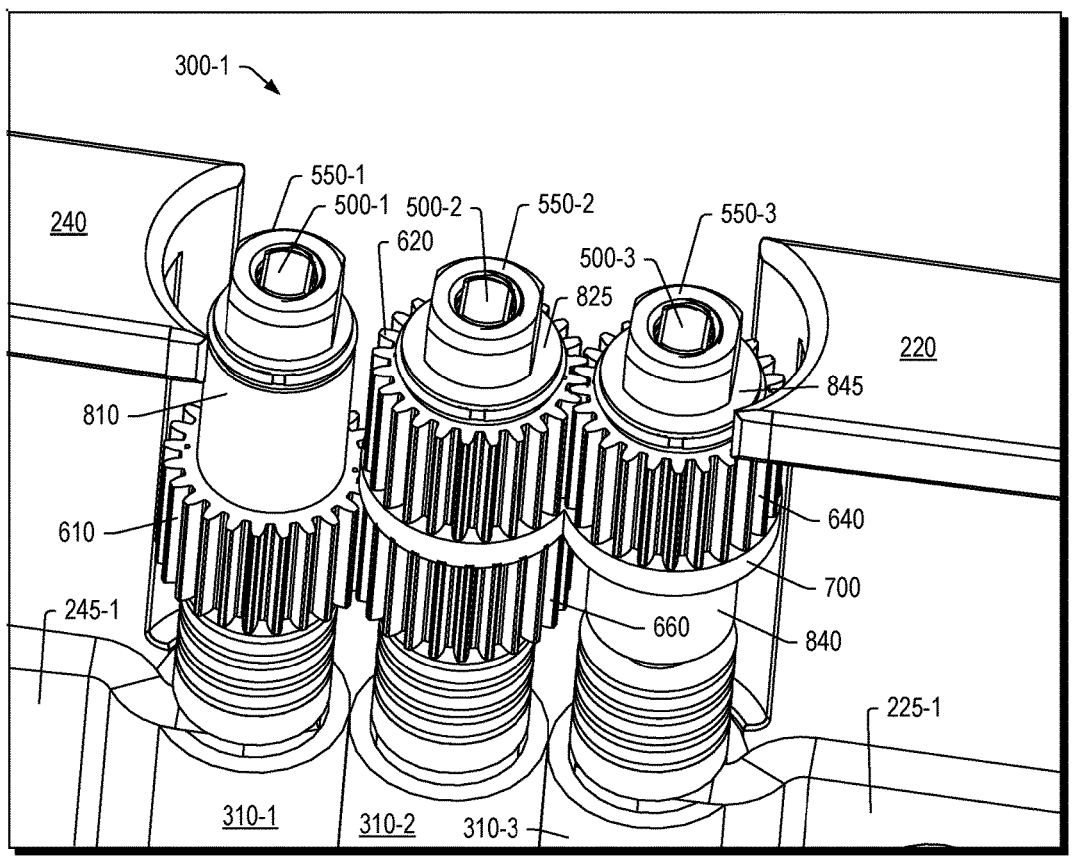

FIG. 14 shows the nuts 550-1, 550-2 and 550-3, which can be received via the bore 422 of the cover 420 and the bores 441 and 443 of the cover 440. Specifically, the bore 422 can receive the nut 550-1, the bore 443 can receive the nut 550-2 and the bore 441 can receive the nut 550-3. As an example, the cover 420 and/or the cover 440 may be removable to adjust one or more of the nuts 550-1, 550-2 and 550-3. The bore 422, the bore 441 and the bore 443 may be through bores or partial bores. Where through bores, these may optionally be covered by respective caps and where partial bores, the covers 420 and 440 can be covers that also cap the nuts 550-1, 550-2 and 550-3.

FIG. 14 also shows a perspective view of a portion of the device 200 where the hinge assembly 300-1 is shown without the covers 420, 440, 460 and 480. As shown, the tubular covers 310-1, 310-2 and 310-3 cover portions of the axles 500-1, 500-2 and 500-3, respectively, where the tubular cover 310-1 includes a slot for the link 245-1 and where the tubular cover 310-3 includes a slot for the link 225-1. The nuts 550-1, 550-2 and 550-3 act to axially locate various components along the axles 500-1, 500-2 and 500-3, respectively, where, for example, the bridge component 700 may be effected by location, torque, etc. of the nut 550-2 and 550-3. As an example, the bushings 810 and 840 may be freely rotatable and may act as axial spacers. As shown, the bushing 810, the keyed washers 825 and 845 along with the clips 815, 817 and 819 can support the covers 420 and 440, which, as shown in FIG. 8, can be keyed with the covers 460 and 480 (e.g., via key and keyway features).

Referring again to FIG. 8 and FIG. 9, the annular components 900-1 can be received via the bore 462, the annular components 900-2 can be received by the bore 464 and the annular components 900-3 can be received by the bore 482. The covers 460 and 480 can cover the annular components 900-1, 900-2 and 900-3 and optionally at least a portion of the circular discs 504-1, 504-2 and 504-3 of the axles 500-1, 500-2 and 500-3. As shown in FIG. 8, the cover 460 is keyed to rotate with the intermediate axle 500-2 per the keyed bore 463 being engaged with a keyed portion of the intermediate axle 500-2. The cover 420 can be without a key or keyway, the cover 440 can be without a key or keyway and the cover 480 can be without a key or keyway.

Figure 15:
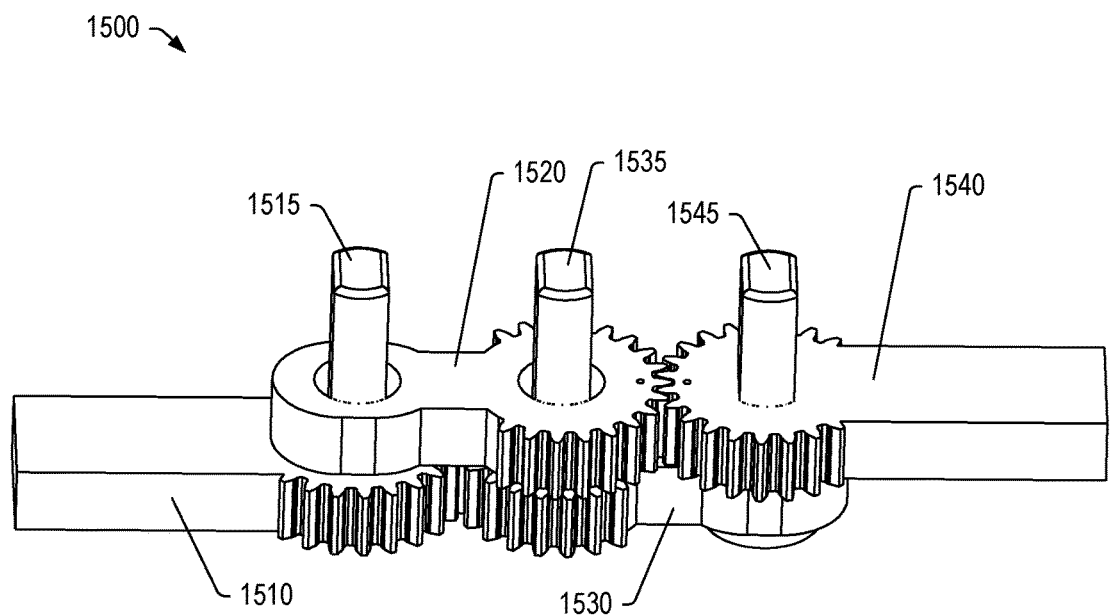
FIG. 15 is a diagram of an example of a hinge assembly.

FIG. 15 shows an assembly 1500 that includes four components 1510, 1520, 1530 and 1540, each of which includes a geared portion. The component 1510 includes an axle 1515, the component 1530 includes an axle 1535 and the component 1540 includes an axle 1545. Such an assembly may be utilized as a hinge assembly where a first housing is attached to the component 1510 and where a second housing is attached to the component 1540.

Figure 16:
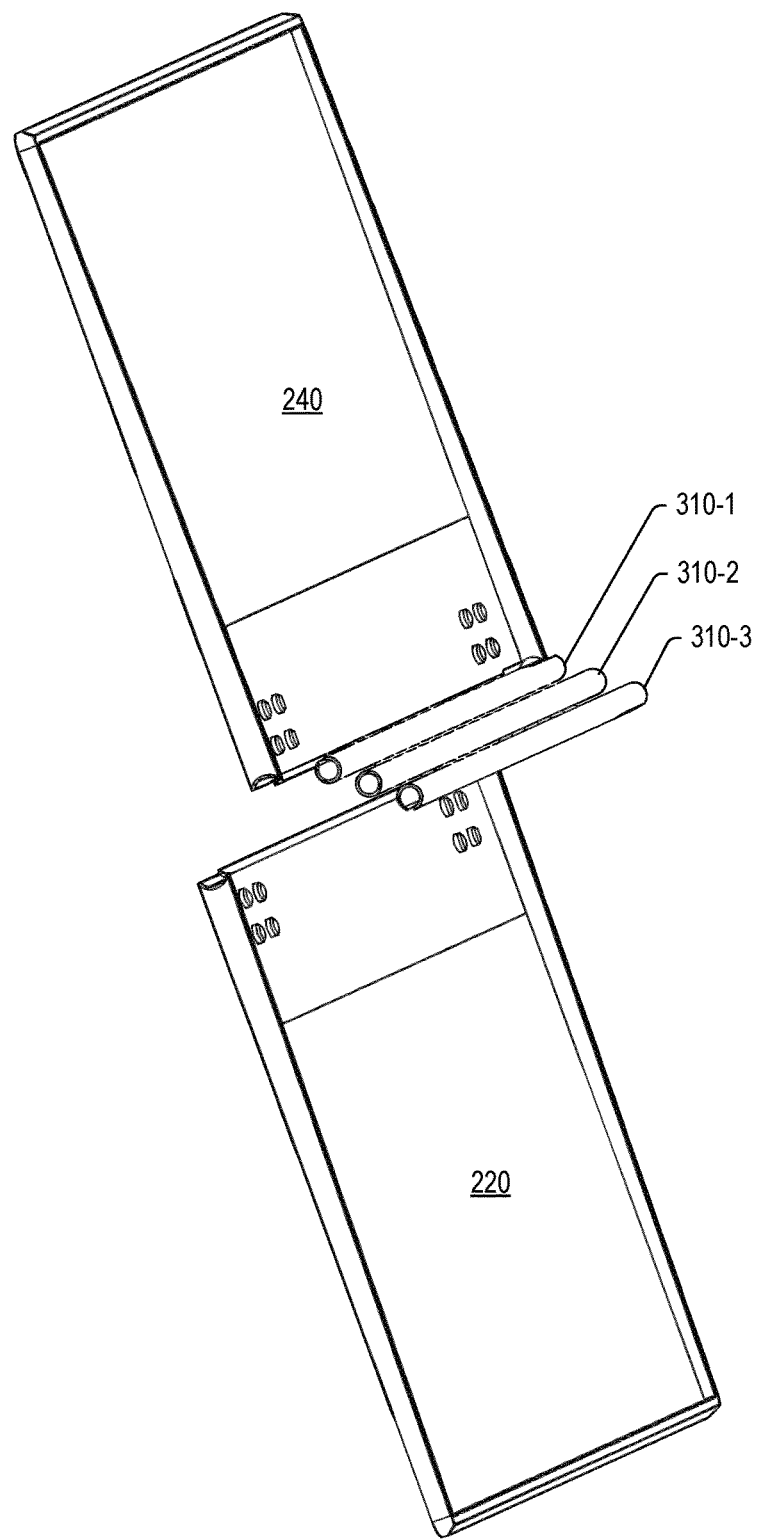
FIG. 16 is a diagram of a portion of an example of a device that includes tubular components.

FIG. 16 shows the first housing 220, the second housing 240 and the tubular covers 310-1, 310-2 and 310-3. One or more of the tubular covers 310-1, 310-2 and 310-3 may be utilized for housing a component or components, wires, etc. and/or as a duct for movement of air.

Figure 17:
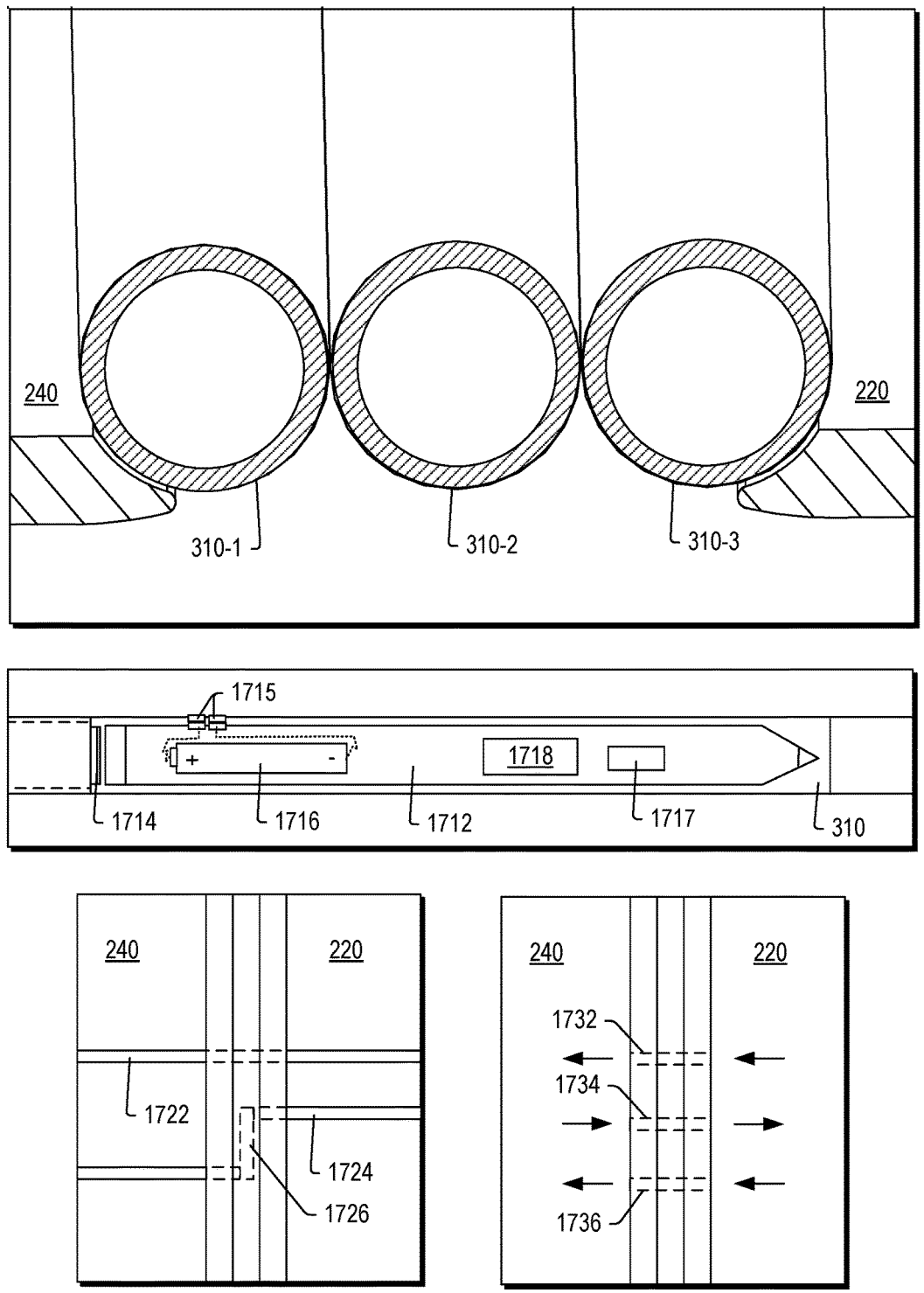
FIG. 17 is a diagram of a portion of a device that includes tubular components.

FIG. 17 shows a cross-sectional view of the first housing 220, the second housing 240 and the tubular covers 310-1, 310-2 and 310-3 and approximate views of a stylus 1712 seated in one of the tubular covers 310, wires 1722 and 1724 passing through the tubular covers and air passages 1732, 1734 and 1736 passing through the tubular covers. As an example, a sliding cover 1714 may be included that can translate axially to cover at least a portion of the stylus 1712 as seated in the tubular cover 310. As an example, a rotating cover may rotate, for example, as a tube within a tube, to cover and expose a stylus seated in the tubular cover 310. As an example, the tubular cover 310 can include one or more electrical contacts 1715 that can contact the stylus 1712 to recharge a battery 1716 of the stylus 1712 (e.g., via circuitry of the stylus 1712). As an example, the stylus 1712 can include a button or buttons 1717 and, for example, circuitry 1718, which may include digitizer circuitry, wireless communication circuitry, etc. As an example, the button 1717 may be actuatable to transmit signals from the stylus 1712 to circuitry of the housing 220 and/or the housing 240 and/or other circuitry. As an example, the button 1717 may be actuatable to transition the stylus 1712 from one state to another state (e.g., on/off, etc.).

As an example, a tubular cover can include a socket, for example, the wires 1724 may be electrically coupled to a socket 1726, which may be, for example, a memory card socket for a memory card, a video socket for a video cable or device, an audio socket for an audio cable or device, a data socket for a data cable or device, a power socket for a power cable or power device (e.g., back-up battery, etc.), etc. As an example, a socket may be a USB socket that can receive a USB cable plug and/or a USB device (e.g., a memory stick, etc.).

Figure 18:
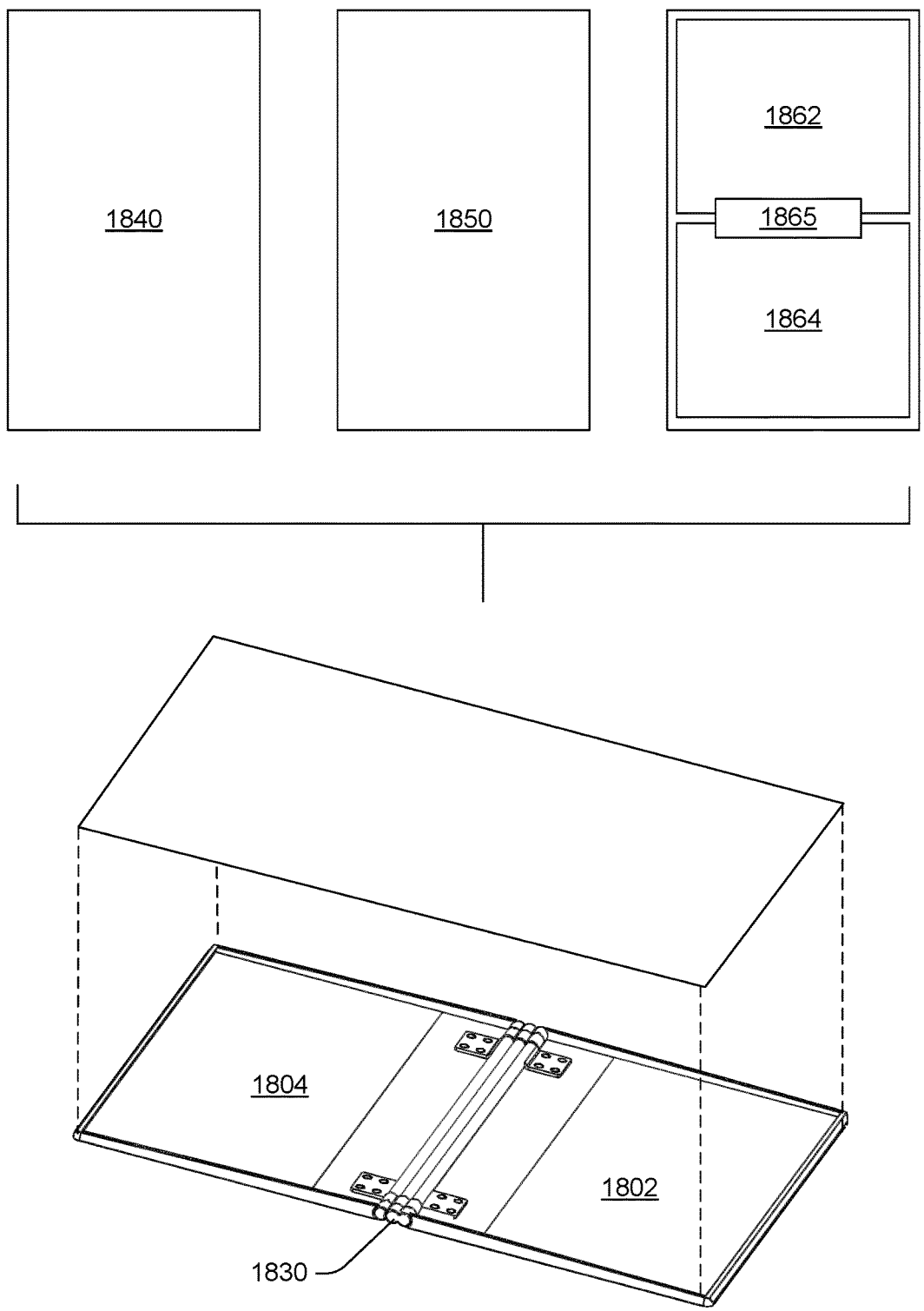
FIG. 18 is a series of diagrams of examples of circuitry that may be included in a device.

FIG. 18 shows examples of circuitry 1840, 1850 and 1862, 1864 and 1865. Such circuitry may be received via a first housing 1802 and a second housing 1804 where, for example, a hinge assembly 1830 operatively couples the first housing 1802 and the second housing 1804 (see also, e.g., the device 200 of FIG. 2). As an example, the circuitry 1840 may be a flexible display (e.g., optionally a flexible touchscreen display), the circuitry 1850 may be a flexible circuit board, and the circuitry 1865 may be flexible and operatively couple the circuitry 1862 and the circuitry 1864 (e.g., which may include display and/or other circuitry). For example, the circuitry 1865 may be or include flexible wires, flexible optical guides (e.g., flat, fiber, etc.). As an example, a housing can include one or more ports that may allow for connections (e.g., power, display, bus, memory, etc.). As an example, one or more connections may provide for electrical and/or optical connection(s) to circuitry that can be housed in the first housing 1802, the second housing 1804 or the first and second housings 1802 and 1804.

As an example, a flexible display may be bendable in a first direction and bendable in a second direction. As an example, a flexible display may be bendable in a first direction but not bendable in a second direction, for example, consider a flexible display that is in a substantially flat (e.g., planar) orientation where it can be bent in one direction to create a radius of curvature bend that brings ends of the flexible display closer to each other but where the flexible display is not bendable in an opposing direction (e.g., without risk of damage to the flexible display). In such an example, the flexible display may be disposed in two housings of a device such that the flexible display is bendable to form a bend and two portions, one portion to each side of the bend, such that the two housings can be closed, for example, to protect the flexible display and reduce overall length of the device. In such an example, the two housings may be opened to a desired angle with respect to each other where the angle may be less than about 180 degrees. In the foregoing two examples, a hinge assembly may provide a radius of curvature when the two housings are closed where the flexible display is not bent beyond a specified radius of curvature (e.g., where bending further may compromise integrity of the flexible display).

As an example, an apparatus can include a processor; an electronic component accessible by the processor; a first housing attached to a first axle that includes a first gear where the first housing includes the processor; a second housing attached to a second axle that includes a second gear where the second housing includes the electronic component accessible by the processor; and a hinge assembly that includes an intermediate axle that includes a first intermediate gear that meshes with the first gear, a second intermediate gear that meshes with the second gear, a first bridge component that securely positions the first axle parallel to the intermediate axle and a second bridge component that securely positions the second axle parallel to the intermediate axle. In such an example, the first intermediate gear and the first bridge component can include an interlocking key and a keyway where, for example, the first intermediate gear includes the key and where the first bridge component includes the keyway that receives the key and the intermediate axle and includes an opening that receives the first axle.

As an example, a first axle, a second axle and an intermediate axle can be keyed. For example, an axle can include a keyed shaft portion that may be partially circular and with one or more flats that define keys.

As an example, in a hinge assembly, a first gear can include a keyway bore where a first axle includes a keyed portion that engages the keyway bore. As an example, in a hinge assembly, a first intermediate gear can include a keywayed bore where an intermediate axle includes a keyed portion that engages the keywayed bore. In such an example, a second intermediate gear can include an unkeywayed bore.

As an example, a second bridge component of a hinge assembly can include a double bored cover (e.g., a housing component for a gear, gears, a bushing, etc.). In such an example, a single bored cover can be included that is coupled to a first bridge component.

As an example, a hinge assembly can include end caps (e.g., covers) that cover ends of a first axle, a second axle and a third axle. In such an example, the end caps can include a double bored end cap and a single bored end cap.

As an example, an apparatus can include a 0 degree orientation of first and second housings about an axis of an intermediate axle of a hinge assembly and a 180 degree orientation of the first and second housings about the axis of the intermediate axle of the hinge assembly. In such an example, the apparatus can include a 360 degree orientation of the first and second housings about the axis of the intermediate axle of the hinge assembly.

As an example, a hinge assembly can couple movement of a first housing to movement of a second housing and vice versa. As an example, an apparatus can be a clamshell computing device. As an example, an apparatus can include a pair of hinge assemblies or, for example, more than two hinge assemblies (e.g., a plurality of the hinge assemblies).

As an example, an apparatus can include three or more housings with hinge assemblies to form a foldable apparatus that can fold to the size of a single housing in its footprint and that can be an expandable apparatus that can expand to the size of the three housings in its footprint (see, e.g., the device 190 of FIG. 1).

As an example, an apparatus can include a hinge assembly disposed along a first edge of the apparatus and can include another hinge assembly disposed along a second edge of the apparatus where, for example, the hinge assemblies include a common listing of components that can be arranged differently to accommodate forming a left side hinge assembly and to accommodate forming a right side hinge assembly (e.g., as may be defined by a right hand side and a left hand side of a keyboard).

As an example, an apparatus can include two hinge assemblies and tubular segments (e.g., tubular covers) that span axially between the two hinge assemblies. In such an example, the tubular segments (e.g., tubular covers) can include at least one wire passage for at least one wire that electrically couples a processor of a first housing to an electronic component of a second housing.

As an example, an apparatus can include a fan where one or more tubular segments (e.g., one or more tubular covers) can include at least one airflow passage in fluid communication with the fan.

As an example, at least one of tubular segments (e.g., tubular cover) can include an electrical socket (e.g., for data, for power, for power and data, etc.).

As an example, an apparatus can include tubular segments (e.g., tubular covers) such as, for example, a first tubular segment, an intermediate tubular segment and a second tubular segment. In such an example, the intermediate tubular segment can be rotatable about an axis defined by the intermediate axle independent of rotation of the first tubular segment and the second tubular segment. As mentioned with respect to FIG. 14, the tubular cover 310-1 and the tubular cover 310-3 can include slots or other features that can accommodate respective links where each link connects a hinge assembly to a respective housing. In such an example, the tubular covers 310-1 and 310-3 can rotate responsive to rotation of the housings while, for example, the tubular cover 310-2 may be independent and, for example, be rotatable by hand, etc. (e.g., to position an opening, a socket, etc.).

As an example, an apparatus can include a stylus where an intermediate tubular segment (e.g., an intermediate tubular cover) includes a stylus recess. In such an example, the intermediate tubular segment may be rotatable about a longitudinal axis such that the stylus recess can accessible and/or inaccessible, for example, depending on orientation of a first housing with respect to a second housing. As an example, in a 180 degree orientation, a stylus recess may be exposed for access to the stylus and, for example, in a 0 degree orientation, the stylus recess may be hidden (e.g., closed) for securing the stylus (e.g., in a closed clamshell orientation of an apparatus). As an example, at least one of tubular segments may include a stylus recess. As an example, an apparatus can include multiple stylus recesses optionally including a stylus or styluses in each of the recesses.

As an example, an apparatus can include a flexible circuit board. As an example, an apparatus can include a flexible display that is housed at least in part by a first housing and at least in part by a second housing. In such an example, at least a portion of the flexible display can include or be a touchscreen display. As an example, an apparatus can be a smart phone.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 19:
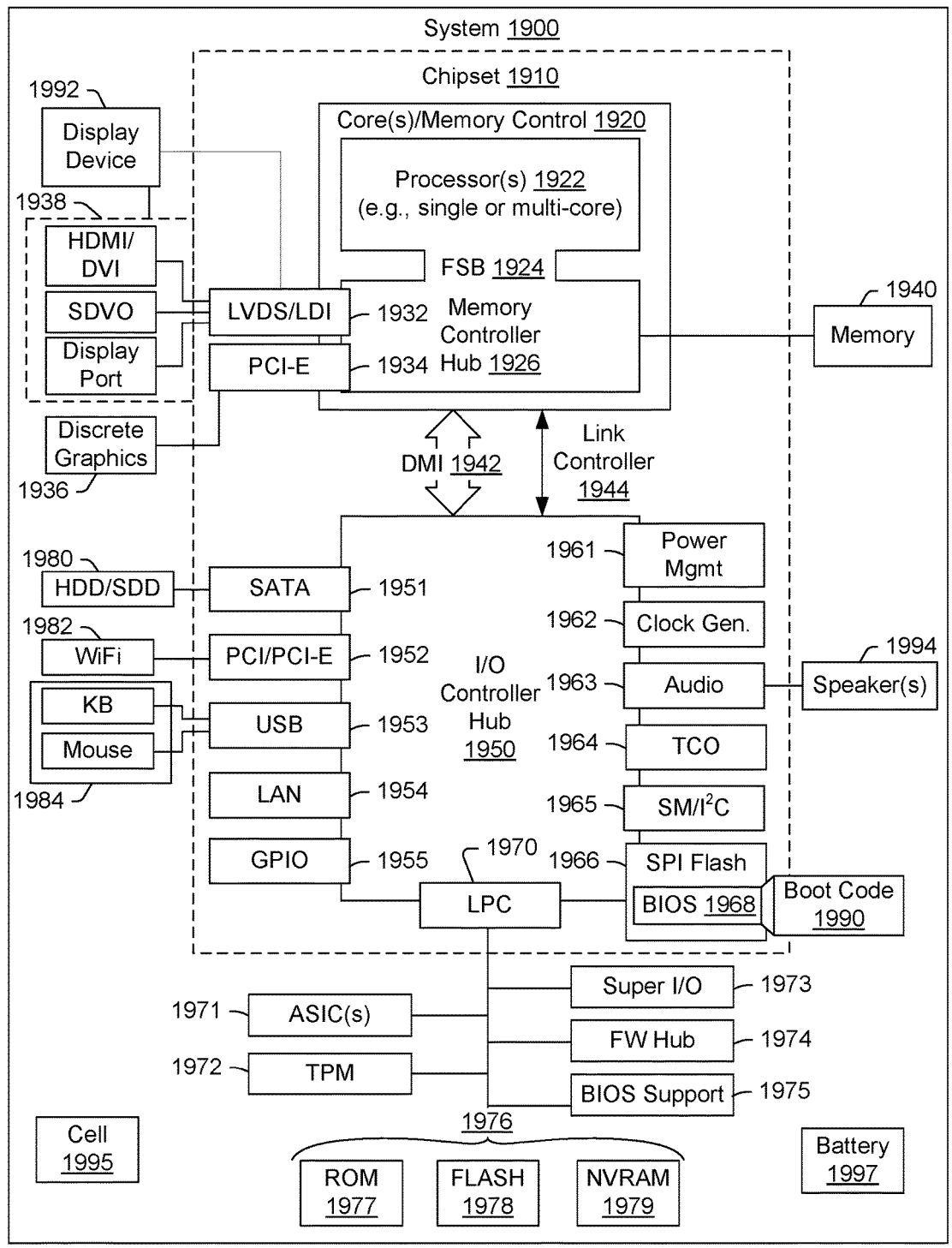
FIG. 19 is a diagram of an example of a system that includes one or more processors.

While various examples of circuits or circuitry have been discussed, FIG. 19 depicts a block diagram of an illustrative computer system 1900. The system 1900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1900. As an example, a system such as the system 100 of FIG. 1 may include at least some of the features of the system 1900; a device such as the device 200 of FIG. 2 may include at least some of the features of the system 1900; etc.

As shown in FIG. 19, the system 1900 includes a so-called chipset 1910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 19, the chipset 1910 has a particular architecture, which may vary to some extent depending on brand or manufacturer. The architecture of the chipset 1910 includes a core and memory control group 1920 and an I/O controller hub 1950 that exchange information (e.g., data, signals, commands, etc.) via, for example, a direct management interface or direct media interface (DMI) 1942 or a link controller 1944. In the example of FIG. 19, the DMI 1942 is a chip-to-chip interface (sometimes referred to as being a link between a "northbridge" and a "southbridge").

The core and memory control group 1920 include one or more processors 1922 (e.g., single core or multi-core) and a memory controller hub 1926 that exchange information via a front side bus (FSB) 1924. As described herein, various components of the core and memory control group 1920 may be integrated onto a single processor die, for example, to make a chip that supplants the conventional "northbridge" style architecture.

The memory controller hub 1926 interfaces with memory 1940. For example, the memory controller hub 1926 may provide support for DDR SDRAM memory (e.g., DDR, DDR2, DDR3, etc.). In general, the memory 1940 is a type of random-access memory (RAM). It is often referred to as "system memory".

The memory controller hub 1926 further includes a low-voltage differential signaling interface (LVDS) 1932. The LVDS 1932 may be a so-called LVDS Display Interface (LDI) for support of a display device 1992 (e.g., a CRT, a flat panel, a projector, etc.). A block 1938 includes some examples of technologies that may be supported via the LVDS interface 1932 (e.g., serial digital video, HDMI/DVI, display port). The memory controller hub 1926 also includes one or more PCI-express interfaces (PCI-E) 1934, for example, for support of discrete graphics 1936. Discrete graphics using a PCI-E interface has become an alternative approach to an accelerated graphics port (AGP). For example, the memory controller hub 1926 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1950 includes a variety of interfaces. The example of FIG. 19 includes a SATA interface 1951, one or more PCI-E interfaces 1952 (optionally one or more legacy PCI interfaces), one or more USB interfaces 1953, a LAN interface 1954 (more generally a network interface), a general purpose I/O interface (GPIO) 1955, a low-pin count (LPC) interface 1970, a power management interface 1961, a clock generator interface 1962, an audio interface 1963 (e.g., for speakers 1994), a total cost of operation (TCO) interface 1964, a system management bus interface (e.g., a multi-master serial computer bus interface) 1965, and a serial peripheral flash memory/controller interface (SPI Flash) 1966, which, in the example of FIG. 19, includes BIOS 1968 and boot code 1990. With respect to network connections, the I/O hub controller 1950 may include integrated gigabit Ethernet controller lines multiplexed with a PCI-E interface port. Other network features may operate independent of a PCI-E interface.

The interfaces of the I/O hub controller 1950 provide for communication with various devices, networks, etc. For example, the SATA interface 1951 provides for reading, writing or reading and writing information on one or more drives 1980 such as HDDs, SDDs or a combination thereof. The I/O hub controller 1950 may also include an advanced host controller interface (AHCI) to support one or more drives 1980. The PCI-E interface 1952 allows for wireless connections 1982 to devices, networks, etc. The USB interface 1953 provides for input devices 1984 such as keyboards (KB), one or more optical sensors, mice and various other devices (e.g., microphones, cameras, phones, storage, media players, etc.). On or more other types of sensors may optionally rely on the USB interface 1953 or another interface (e.g., I²C, etc.). As to microphones, the system 1900 of FIG. 19 may include hardware (e.g., audio card) appropriately configured for receipt of sound (e.g., user voice, ambient sound, etc.).

In the example of FIG. 19, the LPC interface 1970 provides for use of one or more ASICs 1971, a trusted platform module (TPM) 1972, a super I/O 1973, a firmware hub 1974, BIOS support 1975 as well as various types of memory 1976 such as ROM 1977, Flash 1978, and nonvolatile RAM (NVRAM) 1979. With respect to the TPM 1972, this module may be in the form of a chip that can be used to authenticate software and hardware devices. For example, a TPM may be capable of performing platform authentication and may be used to verify that a system seeking access is the expected system.

The system 1900, upon power on, may be configured to execute boot code 1990 for the BIOS 1968, as stored within the SPI Flash 1966, and thereafter processes data under the control of one or more operating systems and application software (e.g., stored in system memory 1940). An operating system may be stored in any of a variety of locations and accessed, for example, according to instructions of the BIOS 1968. Again, as described herein, a satellite, a base, a server or other machine may include fewer or more features than shown in the system 1900 of FIG. 19. Further, the system 1900 of FIG. 19 is shown as optionally include cell phone circuitry 1995, which may include GSM, CDMA, etc., types of circuitry configured for coordinated operation with one or more of the other features of the system 1900. Also shown in FIG. 19 is battery circuitry 1997, which may provide one or more battery, power, etc., associated features (e.g., optionally to instruct one or more other components of the system 1900). As an example, a SMBus may be operable via a LPC (see, e.g., the LPC interface 1970), via an I²C interface (see, e.g., the SM/I²C interface 1965), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   a processor;
   an electronic component accessible by the processor;
   a first housing attached to a first axle that comprises a first gear wherein the first housing comprises the processor;
   a second housing attached to a second axle that comprises a second gear wherein the second housing comprises the electronic component accessible by the processor; and
   a hinge assembly that comprises an intermediate axle that comprises a first intermediate gear that meshes with the first gear, a second intermediate gear that meshes with the second gear, a first bridge component that securely positions the first axle parallel to the intermediate axle and a second bridge component that securely positions the second axle parallel to the intermediate axle.

2. The apparatus of claim 1 wherein the first intermediate gear and the first bridge component comprise an interlocking key and a keyway.

3. The apparatus of claim 2 wherein the first intermediate gear comprises the key and wherein the first bridge component comprises the keyway that receives the key and the intermediate axle and comprises an opening that receives the first axle.

4. The apparatus of claim 1 wherein the first axle, the second axle and the intermediate axle are keyed.

5. The apparatus of claim 1 wherein the first gear comprises a keyway bore and wherein the first axle comprises a keyed portion that engages the keyway bore.

6. The apparatus of claim 1 wherein the first intermediate gear comprises a keywayed bore and wherein the intermediate axle comprises a keyed portion that engages the keywayed bore.

7. The apparatus of claim 6 wherein the second intermediate gear comprises an unkeywayed bore.

8. The apparatus of claim 1 wherein the second bridge component comprises a double bored cover.

9. The apparatus of claim 8 comprising a single bored cover that is coupled to the first bridge component.

10. The apparatus of claim 1 comprising end caps that cover ends of the first axle, the second axle and the third axle.

11. The apparatus of claim 10 wherein the end caps comprise a double bored end cap and a single bored end cap.

12. The apparatus of claim 1 comprising a 0 degree orientation of the first and second housings about an axis of the intermediate axle of the hinge assembly and a 180 degree orientation of the first and second housings about the axis of the intermediate axle of the hinge assembly.

13. The apparatus of claim 12 comprising a 360 degree orientation of the first and second housings about the axis of the intermediate axle of the hinge assembly.

14. The apparatus of claim 1 wherein the hinge assembly couples movement of the first housing to movement of the second housing and vice versa.

15. The apparatus of claim 1 comprising a clamshell computing device.

16. The apparatus of claim 1 comprising a plurality of the hinge assemblies.

17. The apparatus of claim 1 comprising the hinge assembly disposed along a first edge of the apparatus and comprising another hinge assembly disposed along a second edge of the apparatus.

18. The apparatus of claim 1 comprising two of the hinge assemblies and tubular segments that span an axial distance between the two of the hinge assemblies.

19. The apparatus of claim 18 wherein the tubular segments comprise at least one wire passage for at least one wire that electrically couples the processor of the first housing to the electronic component of the second housing.

20. The apparatus of claim 18 wherein the tubular segments comprise an intermediate tubular segment is rotatable about an axis defined by the intermediate axle independent of rotation of a first tubular segment and a second tubular segment.

* * * * *